United States Patent [19]
Rozman et al.

[11] Patent Number: 5,493,200
[45] Date of Patent: Feb. 20, 1996

[54] CONTROL FOR A BRUSHLESS GENERATOR

[75] Inventors: Gregory I. Rozman, Rockford; Albert L. Markunas, Roscoe, both of Ill.; James A. Shippling, Erie, Pa.

[73] Assignee: Sundstrand Corporation, Rockford, Ill.

[21] Appl. No.: 60,959

[22] Filed: May 12, 1993

[51] Int. Cl.$^6$ ............................................. H02K 29/06
[52] U.S. Cl. .......................... 322/10; 322/46; 322/14
[58] Field of Search ............................ 322/10, 29, 25, 322/32; 310/186; 290/31; 318/721

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,723,106 | 2/1988 | Gibbs et al. | 322/26 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,040,366 | 8/1991 | Schulze | 60/39.08 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,132,604 | 7/1992 | Shimane et al. | 322/10 |
| 5,140,245 | 8/1992 | Stacey | 318/723 |
| 5,283,471 | 2/1994 | Raad | 290/46 |
| 5,345,125 | 9/1994 | Raad | 310/68 |
| 5,384,527 | 1/1995 | Rozman et al. | 322/10 |

FOREIGN PATENT DOCUMENTS 2206751A 1/1989 United Kingdom.

OTHER PUBLICATIONS

E. Iizuka, et al., *IEEE Transactions on Industry Applications*, vol. 1A–21, No. 4, May/Jun. 1985.

Furuhashi, et al., *IEEE Transactions on Industrial Electronics*, vol. 39, No. 2, Apr. 1992.

A. E. Fitzgerald, et al., *Electric Machinery*, 246–249, 270–271.

*Primary Examiner*—Thomas M. Dougherty
*Assistant Examiner*—Nicholas Ponomarenko
*Attorney, Agent, or Firm*—Marshall, O'Toole, Gerstein, Murray & Bicknell

[57] ABSTRACT

A control for a brushless generator operable in starting and generating modes supplies combined AC and DC power to an exciter field winding of the brushless generator during operation in the starting mode. The magnitude of a parameter of the AC power is decreased with increasing rotor speed during operation in the starting mode until a particular rotor speed is reached, following which only DC power is supplied to the exciter field winding.

21 Claims, 18 Drawing Sheets

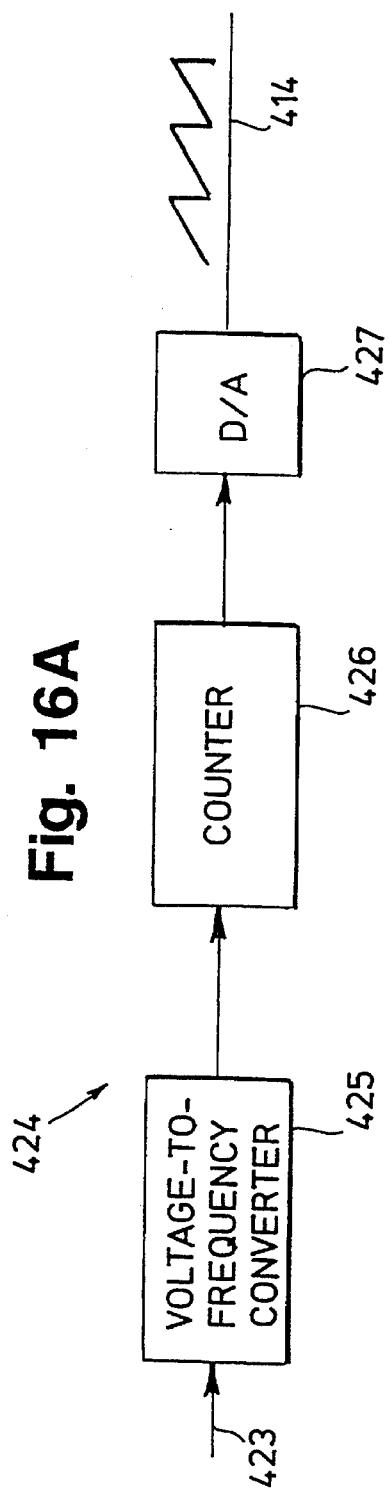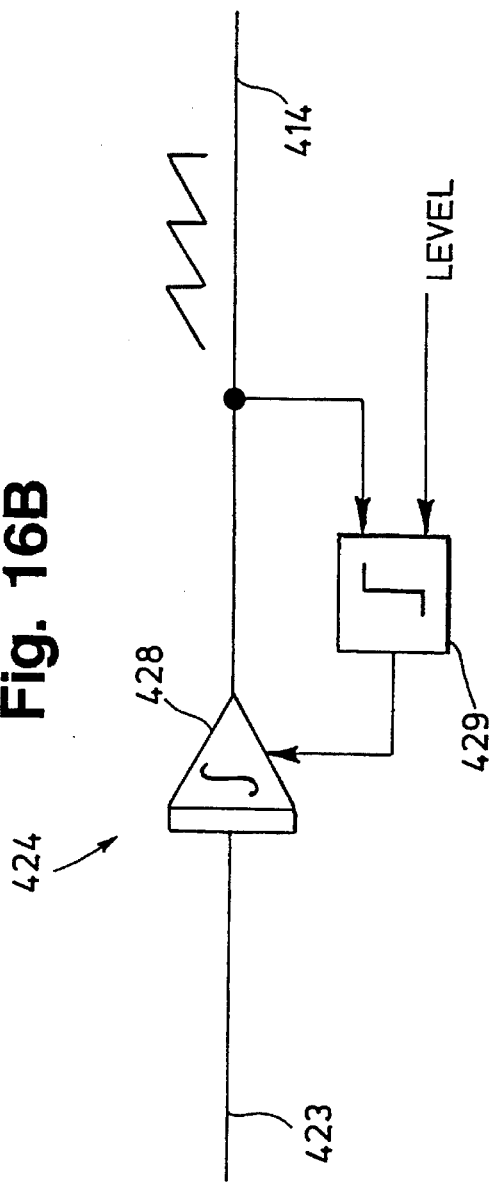

CONTROL FOR A BRUSHLESS GENERATOR

TECHNICAL FIELD

The present invention relates generally to electromagnetic machines, and more particularly to a control for a brushless generator operable in starting and generating modes.

BACKGROUND ART

An auxiliary power unit (APU) system is often provided on an aircraft and is operable to provide auxiliary and/or emergency power to one or more aircraft loads. In conventional APU systems, a dedicated starter motor is operated during a starting sequence to bring a gas turbine engine up to self-sustaining speed, following which the engine is accelerated to operating speed. Once this condition is reached, a brushless, synchronous generator is coupled to and driven by the gas turbine engine during operation in a starting mode whereupon the generator develops electrical power.

As is known, an electromagnetic machine may be operated as a motor to convert electrical power into motive power. Thus, in those applications where a source of motive power is required for engine starting, such as in an APU system, it is possible to dispense with the need for the dedicated starter motor and operate the generator as a motor during the starting sequence to accelerate the engine to self-sustaining speed. This capability is particularly advantageous in aircraft applications where size and weight must be held to a minimum.

The use of a generator in starting and generating modes in an aircraft application has been realized in a variable-speed, constant-frequency (VSCF) power generating system. In such a system a brushless, three-phase synchronous generator operates in the generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads.

The generator of such a VSCF system is operated as a motor in the starting mode to convert electrical power supplied by an external AC power source into motive power which is provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion field windings via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

In order to properly accelerate the generator and prime mover during operation in the starting mode, it is necessary to properly commutate or switch the currents among the armature windings of the generator. In the past, proper commutation was achieved using an absolute position sensor, such as a resolver, a synchro, an optical encoder or hall effect devices. For example, in Lafuze, U.S. Pat. No. 3,902,073 three Hall sensors are mounted in an air gap of a PMG 120 electrical degrees apart with respect to permanent magnet rotor pole pairs. As the rotor of the PMG rotates, the voltage output of each Hall sensor switches on and off as a function of the rotor position thereby generating three square wave voltages spaced apart by 120 electrical degrees. The outputs from the Hall sensors are representative of the position of the PMG rotor. The output signals from the Hall sensors are used to control switching elements in cycloconverters to switch current to armature windings of a main generator portion.

Use of an external absolute position sensor entails considerable expense in the position sensor itself and associated electronics, and further results in extra wires and the need for an extra assembly step to install the components. Also, operational parameters often limit the accuracy of the sensor.

In view of the foregoing difficulties, other approaches have been taken in an effort to detect rotor position without the need for absolute position sensors. In the case of a brushless DC motor control, a back EMF approach has been used to detect rotor position. The back EMF of the motor is defined by the following equation:

$$E_{emf} = K\omega \sin\alpha$$

where K is a constant, $\omega$ is the angular speed of the motor and $\alpha$ is the electrical phase angle of the rotor. From the foregoing equation, it can be seen that if back EMF can be detected, rotor electrical phase angle can be determined and thus proper commutation of the armature windings of the motor can be achieved. The back EMF voltage can be detected using either of two methods, referred to as the direct method and the indirect method.

The direct method can be used to directly measure phase back EMF voltage only when the phase winding is not energized by the inverter connected thereto and when the winding is not short circuited either by closed switches in the inverter or by conducting flyback diodes in the inverter. Such conditions can be realized when a 120 degree commutation algorithm is utilized. In this case, a voltage reading is taken after a short delay following switching of the phase winding off to ensure complete current decay by the freewilling diodes. This direct technique is described in a paper entitled "Microcomputer Control for Sensorless Brushless Motor" by E. Iizuka et al., *IEEE Transactions on Industry Application*, Vol. IA-21, No. 4, May/June 1985.

The indirect method is based on estimating the back EMF from the motive terminal voltage and phase currents. This method is suitable for both 120° and 180° commutation algorithms. One technique that uses this method is described in a paper entitled "Position — and — Velocity Sensorless Control for Brushless DC Motor Using an Adaptive Sliding Mode Observer" by Furuhashi et al., *IEEE Transactions on Industrial Electronics*, Vol. 39, No. 2, April 1992.

Because the back EMF voltage of a motor is zero at standstill and the signal to noise ratio is small at lower speeds, the reliable determination of rotor position by detecting back EMF is limited at low rotor speeds.

A method of using a permanent magnet generator as a position sensor for motor/generator start is described in Stacey U.S. Pat. No. 5,140,245. A standard brushless generator is equipped with a PMG which is used as an emergency electric power source and as a source of control power during a normal or generating mode of operation. The PMG develops a multi-phase output which is supplied to a high resolution phase-locked loop having a binary counter which develops an output signal representing shaft position. This method, however, is limited to the situation where the number of PMG rotor poles is equal to or less than the number of poles on the main generator portion rotor so that ambiguous position readings are avoided.

SUMMARY OF THE INVENTION

In accordance with the present invention, a control for a brushless generator avoids the problems noted with respect to the prior art in a simple and inexpensive fashion.

More particularly, according to a first aspect of the present invention, a control for a brushless generator having a main generator portion and a permanent magnet generator (PMG) includes an exciter having an exciter field winding disposed in a stator of the generator and an armature winding disposed on a rotor on the generator and coupled to a main generator portion field winding. First and second power converters are provided wherein each power converter includes an input and an output. Means are operable in a starting mode for coupling a source of electrical power to the inputs of the first and second power converters, the output of the first power converter to the main generator portion armature winding and the output of the second power converter to the exciter field winding. The coupling means is further operable in a generating mode of operation for disconnecting the source of electrical power from the first and second power converters and connecting a voltage regulator to the exciter field winding and the input of one of the power converters to the main generator portion armature winding. Means are coupled to the first and second power converters and operable in the starting mode for controlling the power converters such that the first power converter provides AC power to the main generator portion armature winding and the second power converter provides AC and DC power simultaneously to the exciter field winding.

Preferably, the controlling means comprises means for causing the magnitude of the AC power applied to the exciter field winding to continuously or stepwise decrease during operation in the starting mode until a particular rotor speed is reached. The causing means may also include means for applying only DC power to the exciter field winding after the particular rotor speed is reached. Preferably, the applying means decreases a parameter of the DC power after a further particular rotor speed is reached. In accordance with the preferred embodiment, the parameter of DC power comprises DC voltage magnitude.

Still further in accordance with the preferred embodiment, the first and second power converters comprise first and second inverters, respectively.

The controlling means preferably comprises means for causing the frequency of the AC power applied to the main generator portion armature winding to uniformly and continuously increase during operation in the starting mode. Also preferably, the causing means includes means for detecting rotor position and means for commutating the main generator portion armature winding based upon the detected rotor position. Further, the detecting means preferably comprises a sensorless rotor position detector. Alternatively, the detecting means may comprise a rotor position sensor.

In accordance with another aspect of the present invention, a control for a brushless generator having a main generator portion and a permanent magnet generator (PMG) includes an exciter having an exciter field winding disposed in a stator and a set of armature windings disposed on a rotor and coupled to a field winding of the main generator portion by a set of rotating rectifiers. First and second inverters and a rectifier bridge are provided each having an input and an output. Contactors are operable in the starting mode for coupling a source of electrical power to the inputs of the first and second power converters, the output of the first power converter to the set of main generator portion armature windings and the output of the second power converter to the exciter field winding. The contactors are operable in the generating mode for disconnecting the source of electrical power from the first and second inverters and connecting a voltage regulator to the exciter field winding, the input of the rectifier bridge to the set of main generator portion armature windings and the input of one of the power converters to the output of the rectifier bridge. Means are coupled to the first and second inverters and operable in the starting mode for controlling the inverters such that the first inverter provides AC power to the set of main generator portion armature windings and the second inverter simultaneously provides AC and DC power to the exciter field winding and such that the AC power applied to the exciter field winding decreases in magnitude during operation in the starting mode until a particular rotor speed is reached. The controlling means are operable in the generating mode for controlling the power converter coupled to the main generator portion armature winding such that AC power is produced at the output of such power converter.

The control of the present invention includes a number of components which are used both in the generating and starting modes. This high degree of commonality leads to a desirable system simplification with attendant size and weight reduction.

BRIEF DESCRIPTION OF THE DRAWINGS

FIG. 8 illustrates a number of signals generated during the operation of the power conversion system of FIG. 1;

FIG. 16A is a block diagram of a first embodiment of the voltage-to-angle converter of FIG. 16;

FIG. 16B is a block diagram of a second embodiment of the voltage-to-angle converter of FIG. 16;

DESCRIPTION OF THE PREFERRED EMBODIMENTS

Figure 1:
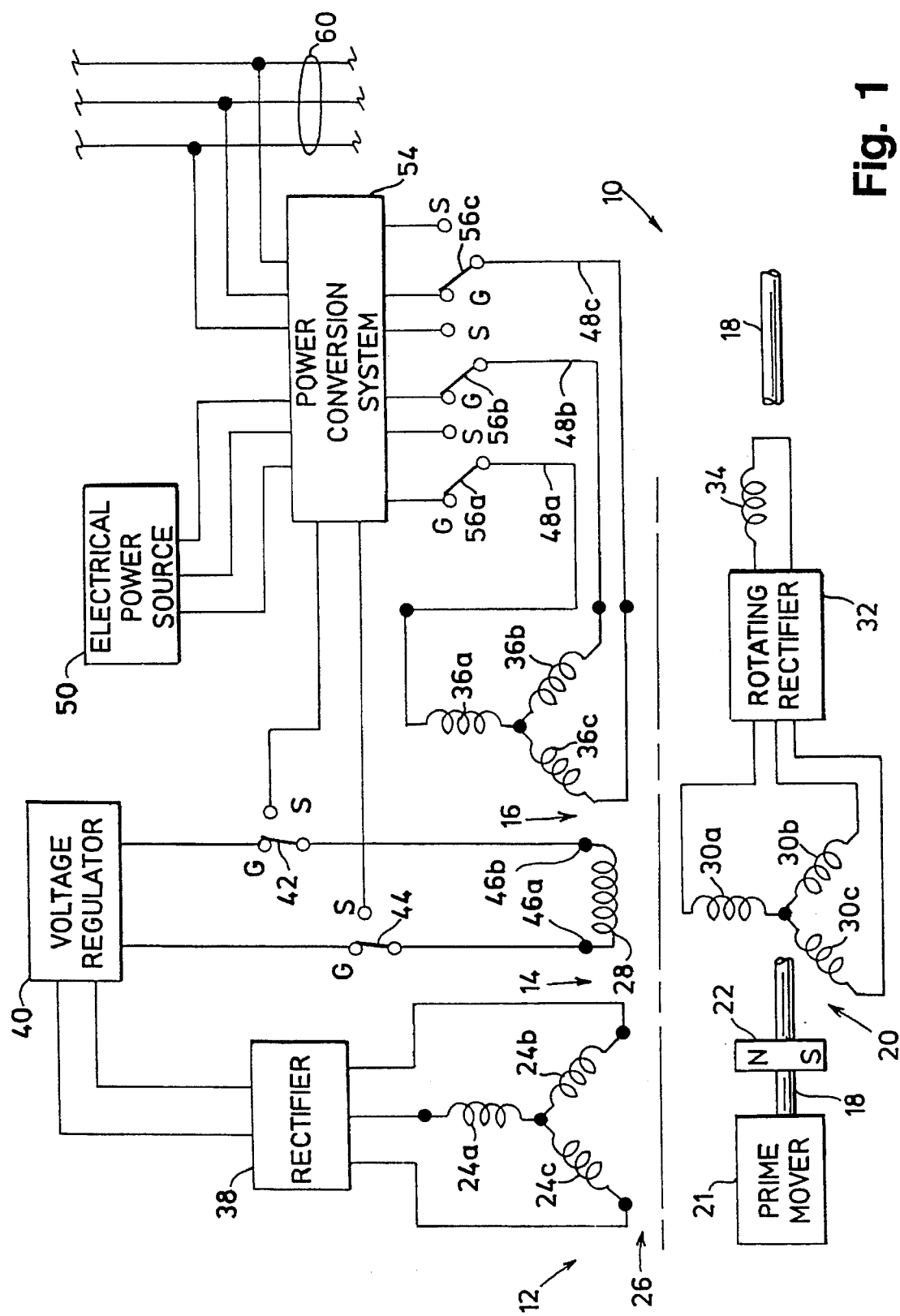
FIG. 1 comprises a combined block and schematic diagram of a brushless, synchronous generator together with a power conversion system which together may comprise an aircraft auxiliary power unit.

Referring now to FIG. 1, a brushless, synchronous generator 10 includes a permanent magnet generator (PMG) 12, an exciter portion 14 and a main generator portion 16. The generator 10 further includes a motive power shaft 18 connected to a rotor 20 of the generator 10. The motive power shaft 18 may be coupled to a prime mover 21, which may comprise, for example, a gas turbine engine. The generator 10 and the prime mover 21 may comprise portions of an aircraft auxiliary power unit (APU) or any other power conversion system.

The rotor 20 carries one or more permanent magnets 22 which form poles for the PMG 12. Rotation of the motive power shaft 18 causes relative movement between the magnetic flux produced by the permanent magnet 22 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. A set of three-phase main generator portion armature windings 36a–36c is disposed in the stator 26.

During operation in a generating mode, the PMG armature windings 24a–24c are coupled through a rectifier 38, a voltage regulator 40 and a pair of switches 42, 44 to end taps 46a, 46b of the exciter field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional.

Often, it is desirable to use the brushless generator 10 as a motor to bring the prime mover 21 up to self-sustaining speed. This operation is accomplished by providing electrical power to the main generator portion field winding 34 via the exciter 14, providing AC power to the main generator portion armature windings 36a–36c via lines 48a–48c and suitably commutating the currents flowing in the windings 36a–36c to cause the motive power shaft 18 to rotate. In the present invention, this operation is achieved by connecting an external electrical power source 50 to a power conversion system 54. A series of switches 56a–56c, as well as the switches 42, 44, are moved to the positions opposite that shown in FIG. 1 so that the power conversion system 54 is connected to the set of armature windings 36a–36c and so that the power conversion system 54 is coupled to the end taps 46a and 46b of the exciter field winding 28. The power conversion system 54 is operated to supply power as appropriate to the windings 36a–36c and the winding 28 to cause the motive power shaft 18 to rotate and thus develop motive power.

During operation in the generating mode, the switches 56a–56c are placed in the positions shown in FIG. 1 and the power conversion system 54 is operated to produce constant-frequency AC power on a load bus 60.

Figure 2:
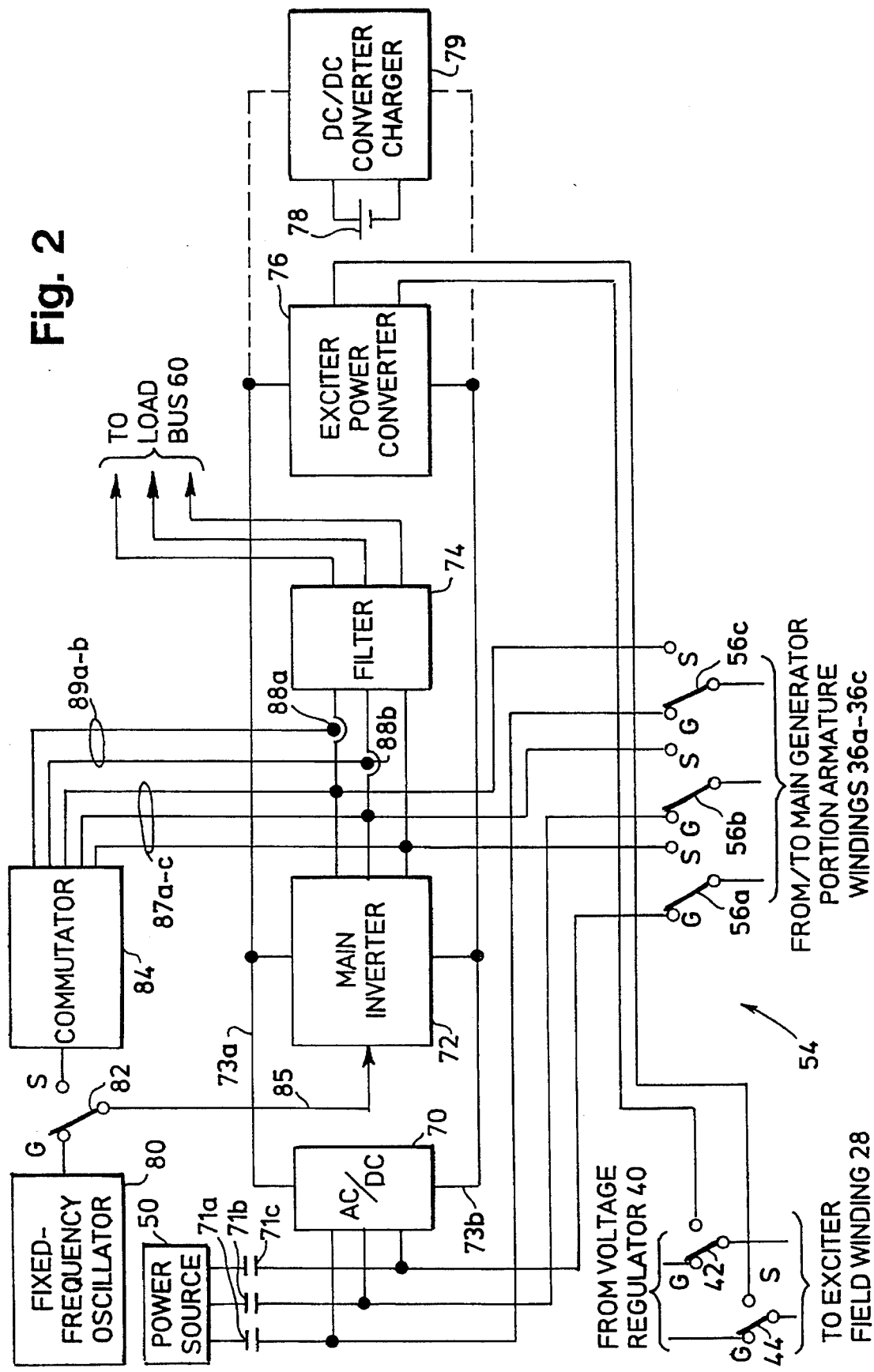
FIG. 2 is a block diagram of the power conversion system of FIG. 1.

Referring now to FIG. 2, the power conversion system 54 includes an AC/DC converter 70 in the form of a rectifier bridge which receives AC power from the power source 50 via contactors 71a–71c. The power conversion system 54 also includes a first power converter comprising a main inverter 72 coupled between a DC bus or link having conductors 73a, 73b, a fixed-frequency oscillator 80, and a mode switch 82. The power conversion system also includes a filter 74 and an exciter power converter 76 coupled to the DC bus conductors 73a, 73b.

If desired, DC power may alternatively be supplied over the DC bus conductors 73a, 73b by a battery 78 and a DC/DC converter/charger 79, wherein the latter may be operated to step up the battery voltage to a desired level of, for example, 270 volts, and which may be operated in the generating mode to maintain sufficient charge on the battery 78 for starting purposes.

During operation in the generating mode, the switches are in the position shown in FIG. 2 and the contactors 71a–71c are opened. The main generator portion armature windings 36a–36c are thus coupled to the AC/DC converter 70, which in turn provides DC power to the main inverter 72. This power may also be supplied to the exciter power converter 76; however, since the converter 76 is not operated in the generating mode, no power is supplied by the converter 76 to any of the components. The main inverter 72 converts the DC power into constant-frequency AC power which is filtered by the filter 74 and supplied to the load bus 60. The main inverter 72 receives a frequency reference signal developed by the fixed frequency oscillator 80 via the switch 82. The frequency reference signal establishes the operating frequency of the main inverter 72.

During operation in the starting mode, the switches 42, 44, 56a–56c and 82 are moved to the positions opposite those shown in FIG. 2. In addition, the contactors 71a–71c are closed. The AC/DC converter 70 develops DC power at an appropriate level which is supplied to the main inverter 72 and the exciter power converter 76. Alternatively, in the event the battery 78 and the converter/charger 79 are used, the latter is operated to produce DC power at an appropriate level on the DC bus conductors 73a, 73b.

During starting mode, the commutator 84 is coupled to the main inverter 72 via the mode switch 82 and generates a set of inverter drive or command signals which are provided to the main inverter 72 via line 85 to properly commutate the currents flowing in the windings 36a–36c. The commutator 84 generates the command signals based on the phase voltages at the main generator portion armature windings 36a–36c, which are detected by the commutator 84 via lines 87a–87c, and the phase currents in the windings 36a–36b, which are detected via a pair of current sensors 88a–88b and provided to the commutator 84 via a pair of lines 89a–89b.

It should be noted that the design of the inverter 72 may be conventional in nature. For example, the main inverter 72 may comprise a six switch converter wherein the switches are connected in a bridge configuration together with flyback diodes and wherein the inverter is operated in a current mode of operation in accordance with pulse-width modulated (PWM) switch control waveforms.

At initiation of operation in the starting mode, AC power is delivered by the main inverter 72 to the main generator portion armature windings 36a–36c. Further, the exciter power converter 76 delivers combined AC and DC power to the exciter field winding 28. The exciter 14 acts as a rotary transformer having a primary winding comprising the field winding 28 and secondary windings comprising the armature windings 30a–30c so that AC power is induced in the armature windings 30a–30c. This AC power is rectified by the rotating rectifiers 32 and applied as DC power to the main generator portion field winding 34. Interaction of the resulting magnetic fields causes the rotor 20 to rotate relative to the stator 26 so that the motive power shaft 18 is accelerated.

The frequency of the AC waveforms applied to the main generator portion armature windings 36a–36c is continuously and preferably uniformly increased during the start mode in a linear fashion. In addition, the magnitude of the AC voltage applied to the exciter field winding 28 is continuously decreased in a linear fashion during operation in the start mode until a first particular rotor speed is reached to prevent over excitation and thus limit the generator accelerating capability. Preferably, this AC power is maintained at a substantially constant frequency. Still further, the magnitude of the DC voltage applied to the exciter field winding 28 is preferably continuously and uniformly increased during operation in the starting mode until a second particular rotor speed is reached. Thereafter, the DC voltage magnitude is kept substantially constant until a third particular rotor speed is reached, following which the DC voltage magnitude is decreased with increasing speed.

Following operation in the starting mode, operation may commence in the generating mode, as described above.

Exciter Power Converter 76

Figure 3:
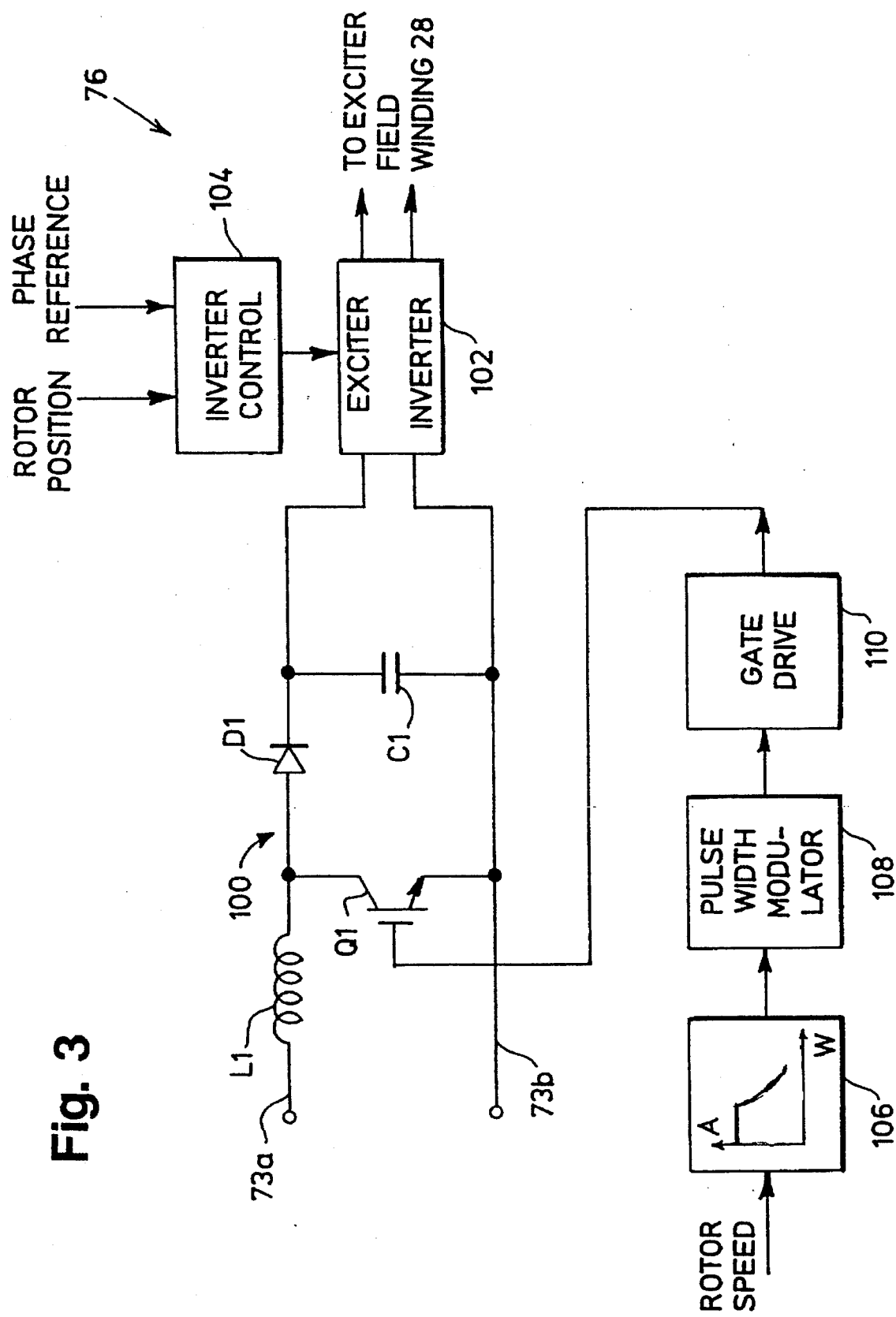
FIG. 3 is a combined schematic and block diagram of the exciter power converter of FIG. 2.

Referring now to FIG. 3, the exciter power converter 76 includes a DC/DC boost converter 100 which is in turn coupled to an exciter inverter 102. The boost converter 100 includes an inductor L1, a controllable switch Q1, a diode D1 and a capacitor C1. The controllable switch Q1 is operated to cause the input voltage magnitude appearing on the DC bus conductors 73a, 73b to be boosted to a level as needed to properly energize the exciter field winding 28. A function generator 106 is responsive to the speed of the rotor 20 and provides a linearly decreasing output with increasing rotor speed. A signal indicative of rotor speed may be developed as described below in connection with the description of the commutator 84. A pulse-width modulator 108 develops a pulse-width modulation (PWM) control signal comprising a series of pulses having widths which are dependent upon the output of the function generator 106. A gate drive circuit 110 develops a gate drive signal of appropriate magnitude for the controllable switch Q1 from the output of the pulse-width modulator 108.

The exciter inverter 102 is operated by an inverter control 104, which is responsive to a rotor position signal and a phase reference signal. A signal indicative of rotor position may be developed as described below in connection with the description of the commutator 84.

Figure 4:
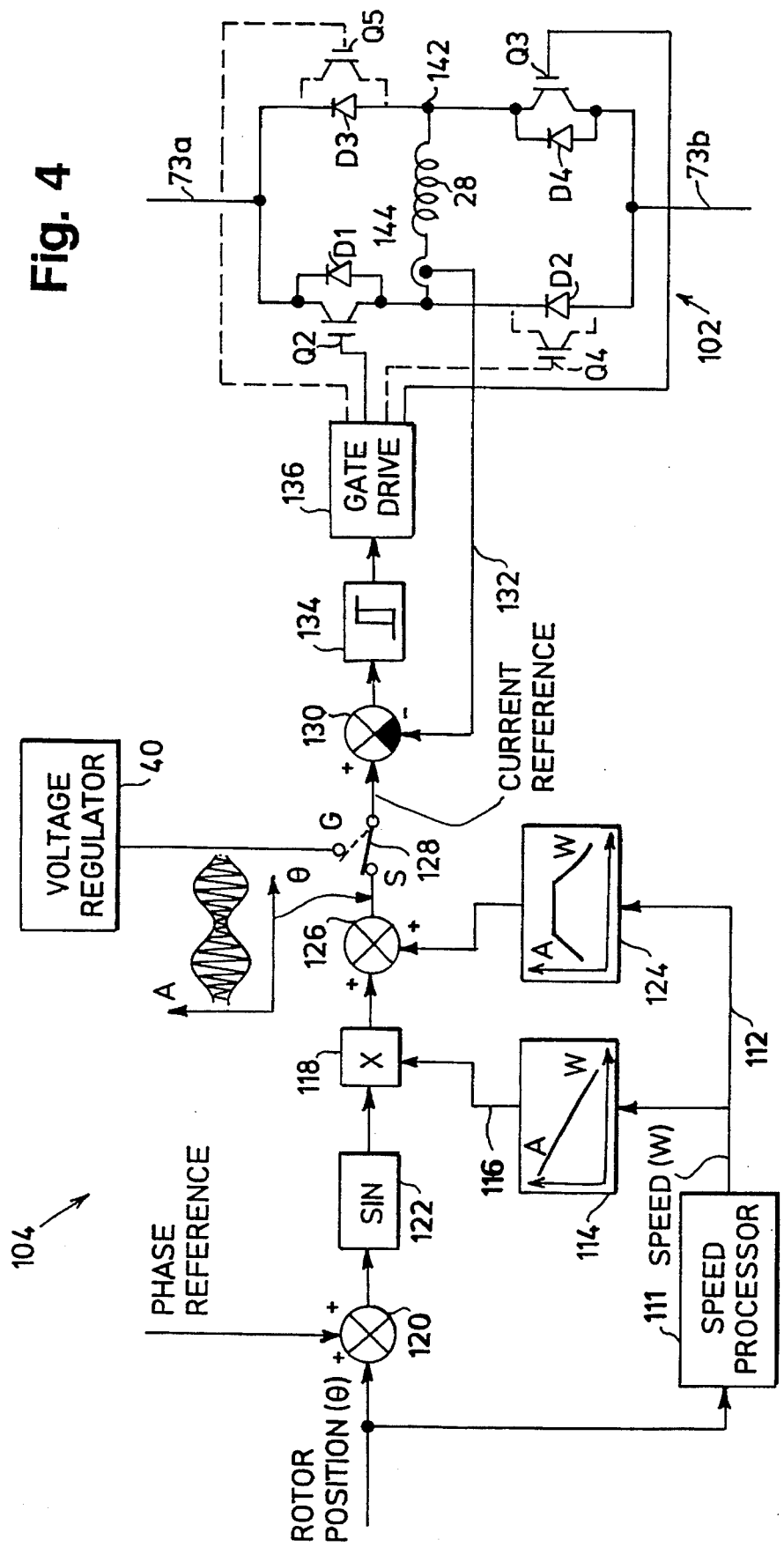
FIG. 4 is a combined schematic and block diagram of the exciter inverter and associated inverter control of FIG. 3.

FIG. 4 illustrates the inverter control 104 in greater detail. The rotor position signal is supplied to a speed processor 111 which develops a signal on a line 112 representing the speed of the rotor 20. A function generator 114, similar to the function generator 106 of FIG. 3, develops an output signal on a line 116 which linearly and continuously decreases with increasing rotor speed. A multiplier 118 modulates a sinusoidal signal developed by a summer 120 and a sine generator 122 with the output of the function generator 114. The summer 120 sums the rotor position signal with the phase reference signal and the sine generator 122 develops a sinusoidal signal at a phase displacement determined by the output of the summer 120.

A further function generator 124 develops a DC reference signal based upon the speed signal appearing on the line 112. The function generator 124 provides a substantially linearly increasing output as speed is increased up to the second particular rotor speed and thereafter provides a substantially constant output level until the third particular rotor speed is reached. Thereafter, the DC reference signal drops in magnitude. The DC reference signal is summed with the output of the multiplier 118 by a summer 126 and, during operation in the starting mode, the resulting signal is passed by a switch 128 to a further summer 130. The signal produced by the summer 126 comprises a current reference signal from which a current feedback signal developed on a line 132 is subtracted. The resulting current error signal is supplied to a comparator 134 which in turn produces control signals which are processed by a gate drive circuit 136 to derive gate drive signals. In the embodiment shown, the gate drive signals control first and second switches Q2, Q3 of the exciter inverter 102. The exciter inverter further includes diodes D1–D4 wherein the switches Q2, Q3 and the diodes D1–D4 are connected in a half-bridge configuration and wherein the exciter field winding 28 is connected across nodes 140, 142. A current sensor 144 provides the current feedback signal to the summer 130 described above.

If necessary or desirable, the exciter inverter may be converted to the full-bridge type. In this case, additional switches Q4 and Q5 (shown in dotted lines in FIG. 4) may be coupled across the diodes D2 and D3, respectively, in the event that bidirectional current through the exciter field winding 28 is desired or necessary.

As noted above, during operation in the starting mode, the switches Q2 and Q3 (and the switches Q4 and Q5, if used) are operated to provide AC and DC power to the exciter field winding 28. The magnitude of the AC voltage, which is preferably maintained at a constant frequency throughout the start sequence, decreases in a substantially linear fashion until a certain speed is reached. Thereafter, only DC power is supplied to the exciter field winding. During the time that AC and DC power are simultaneously supplied to the exciter field winding 28, the voltage developed across the exciter field winding 28 comprises an amplitude modulated sinewave superimposed on a DC level wherein the magnitude of the modulation decreases with increasing speed. In addition, the DC level on which the AC waveform is superimposed increases until the second particular rotor speed is reached following which the DC level remains a substantially constant level until the third particular rotor speed is reached. Thereafter, the DC level is decreased in magnitude to provide field weakening and thereby permit continued acceleration of the rotor 20. If desired, the comparator 134 may be replaced by a proportional plus gain unit together with a pulse-width modulator for developing appropriate control signals for the switches Q2 and Q3 (and, if used, the switches Q4 and Q5).

During operation in the generating mode, the switch 128 is moved to the position opposite that shown in FIG. 4, and hence the exciter inverter 102 receives the output of the voltage regulator 40.

Commutator 84

Figure 5:
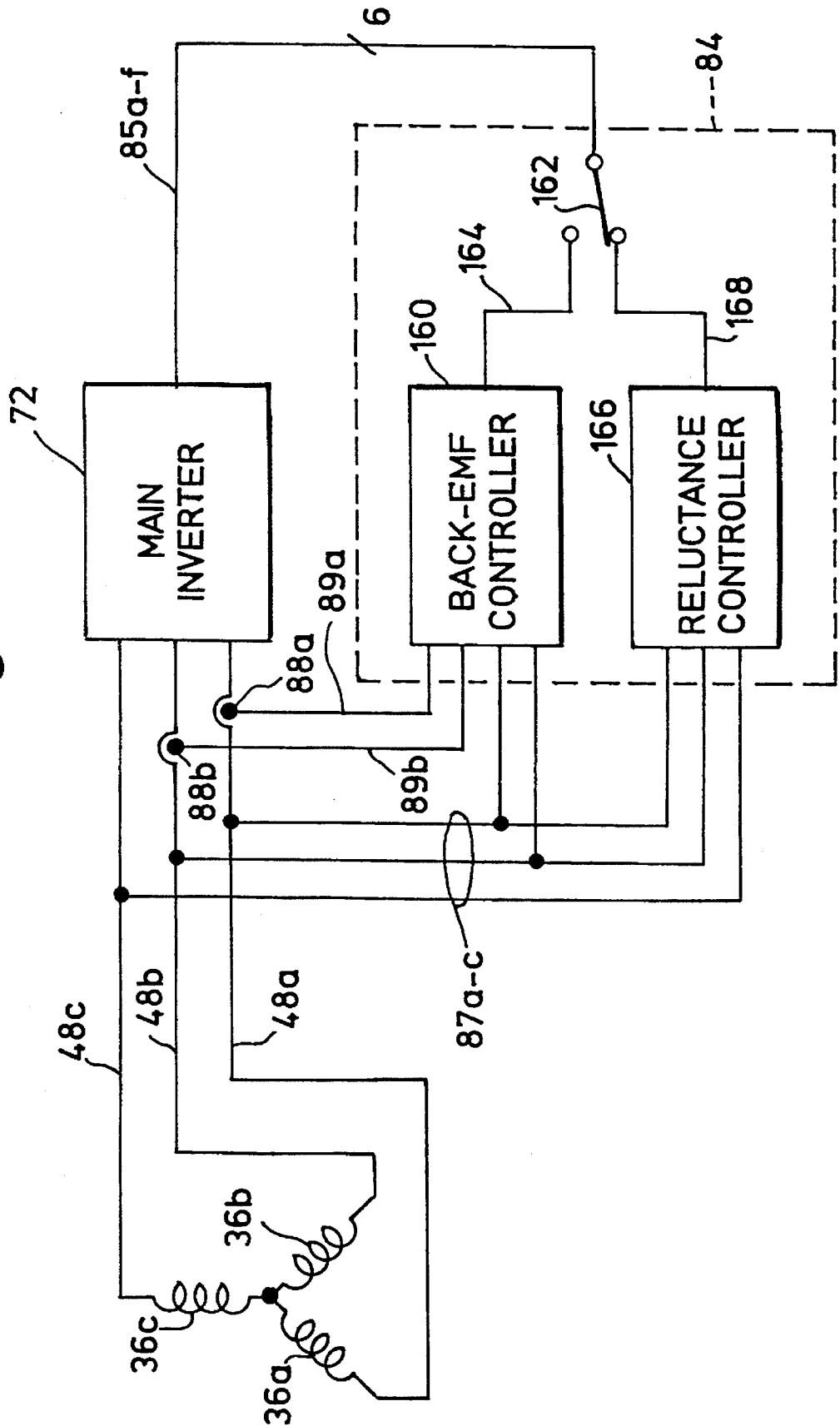
FIG. 5 is a block diagram of the commutator, the main inverter and the main generator portion armature windings of FIG. 2.

FIG. 5 illustrates a block diagram of the commutator 84 shown connected to the main inverter 72 and the main generator portion armature windings 36a–36c. The commutator 84 includes a back-EMF controller 160, a switch 162 coupled to the back-EMF controller 160 by a set of lines 164, and a reluctance controller 166 coupled to the switch 162 by a set of lines 168.

During operation in the starting mode, commutation or inverter drive signals are provided to the main inverter 72 over lines 85a–85f based on either the differential reluctance between the windings 36a–36c or the back EMF produced in the generator 10.

More specifically, during an initial portion of the starting mode, when the rotor 20 is at low speed and the magnitude of the back EMF generated in the windings 36a–36c is relatively small, the commutation signals are generated by the reluctance controller 168, and the switch 162 occupies the position shown in FIG. 5 to provide the commutation signals to the main inverter 172.

When a rotor speed threshold is reached and the magnitude of the back EMF is sufficiently large, the switch 162 is switched to connect the line 164 to the main inverter 72 so that the commutation signals generated by the back-EMF controller 160 are used to drive the inverter 72.

The point at which the switch 162 is switched may be determined in a number of ways, such as when the magnitude of the back EMF reaches a predetermined threshold and/or when the rotor 20 reaches a predetermined rotational speed.

Reluctance Controller 166

Figure 6:
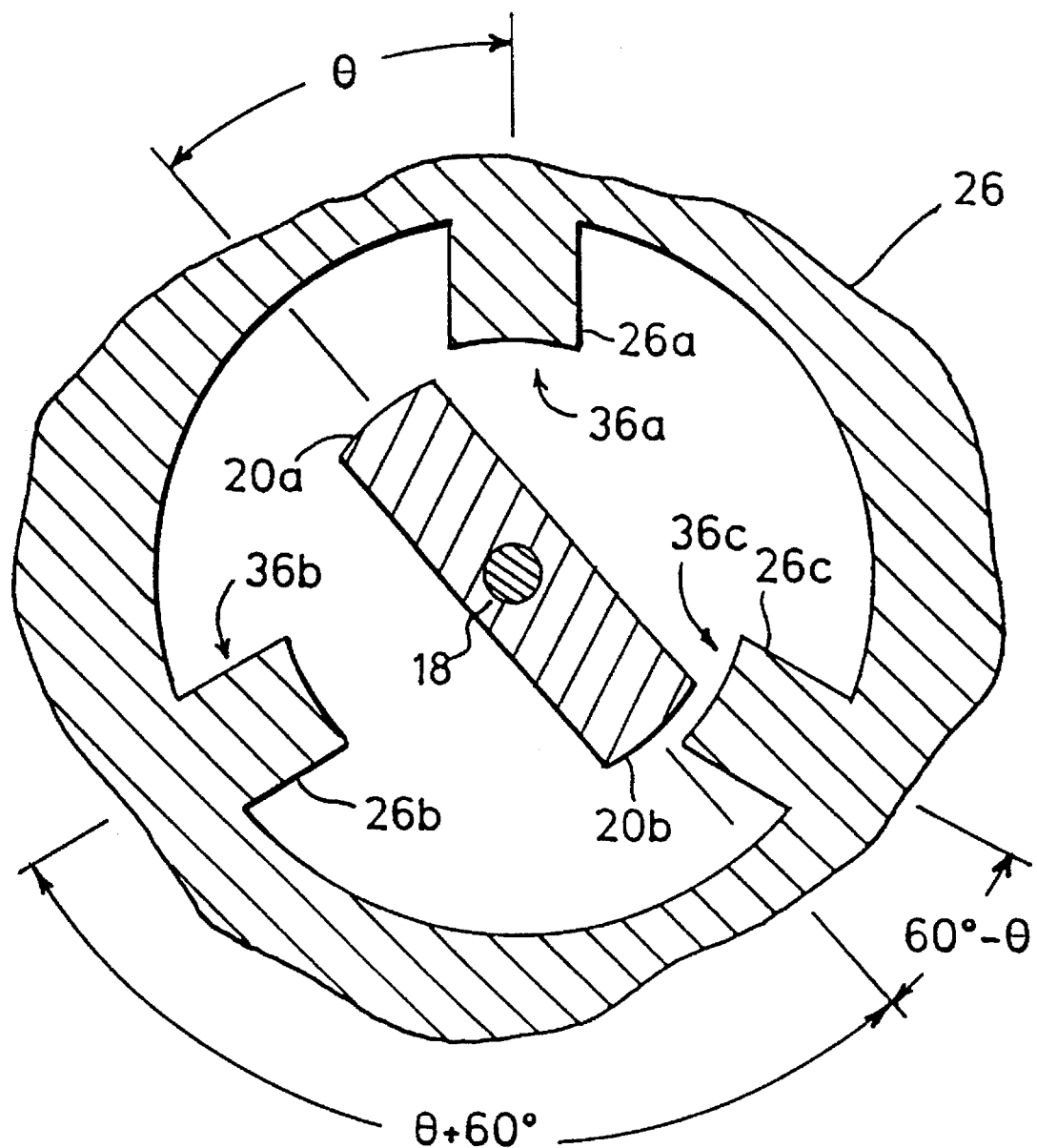
FIG. 6 is a cross-section of a stator and a rotor of a synchronous machine.

The reluctance controller 166 and its theory of operation is described in detail below in connection with FIGS. 6–13. Referring to FIG. 6, a cross section of a portion of a simplified version of the stator 26 and the rotor 20 are shown. The three-phase windings 36a–36c are wound about stator poles 26a–26c while the field winding 34 is wound about a rotor pole 28.

The rotor pole 20a has a first end 20a-1 and a second end 20a-2. As shown in FIG. 6, the first rotor end 20a-1 is aligned at an angle Θ with respect to the phase winding 36a; the second rotor end 20b-2 is aligned at an angle Θ+60° with respect to the second phase winding 36b; and the second rotor end 20a-2 is aligned at an angle 60° −Θ with respect to the third phase winding 36c.

The reluctance, or magnetic path length, between various pairs of the three phase windings 36a–36c varies as a function of rotor position in accordance with the following equations:

$$R_{ac}=K_1+K_2 \cos \Theta \cos (60°-\Theta),  \quad [1]$$

$$R_{ab}=K_1+K_2 \cos \Theta \cos (\Theta+60°),  \quad [2]$$

where $R_{ac}$ is the reluctance between the phase windings 36a, 36c, where $R_{ab}$ is the reluctance between the phase windings 36a, 36b, $K_1$ is a first constant, $K_2$ is a second constant, and Θ is the angle defined in FIG. 6.

The differential reluctance between various pairs of the three phase windings 36a–36c also varies as a function of rotor position. The differential reluctance is the difference between the reluctance between a first pair of windings and a second pair of windings. For example, the differential reluctance between phase windings 36b, 36c, referred to herein as $R_{b-c}$, is the difference between $R_{ab}$ and $R_{ac}$. It should be appreciated that the differential reluctance $R_{b-c}$ is zero when the rotor 20 is vertically aligned in FIG. 6. From equations [1] and [2] above, the differential reluctance $R_{b-c}$ is as follows:

$$R_{b-c}=R_{ab}-R_{ac} \quad [3]$$

$$R_{b-c}=K_1+K_2\cos \Theta \cos (\Theta+60°)-K_1-K_2\cos \Theta \cos (60°-\Theta) \quad [4]$$

$$R_{b-c}=K_2[\cos \Theta \cos (\Theta+60°)-\cos \Theta \cos (60°-\Theta)] \quad [5]$$

Equation [5] above can be further simplified to show that the differential reluctance $R_{b-c}$ is proportional to sin 2Θ. The differential reluctances $R_{a-c}$ and $R_{a-b}$ can be shown to be proportional to sin 2 (Θ−60°) and sin 2 (Θ+60°), respectively.

Figure 7A:
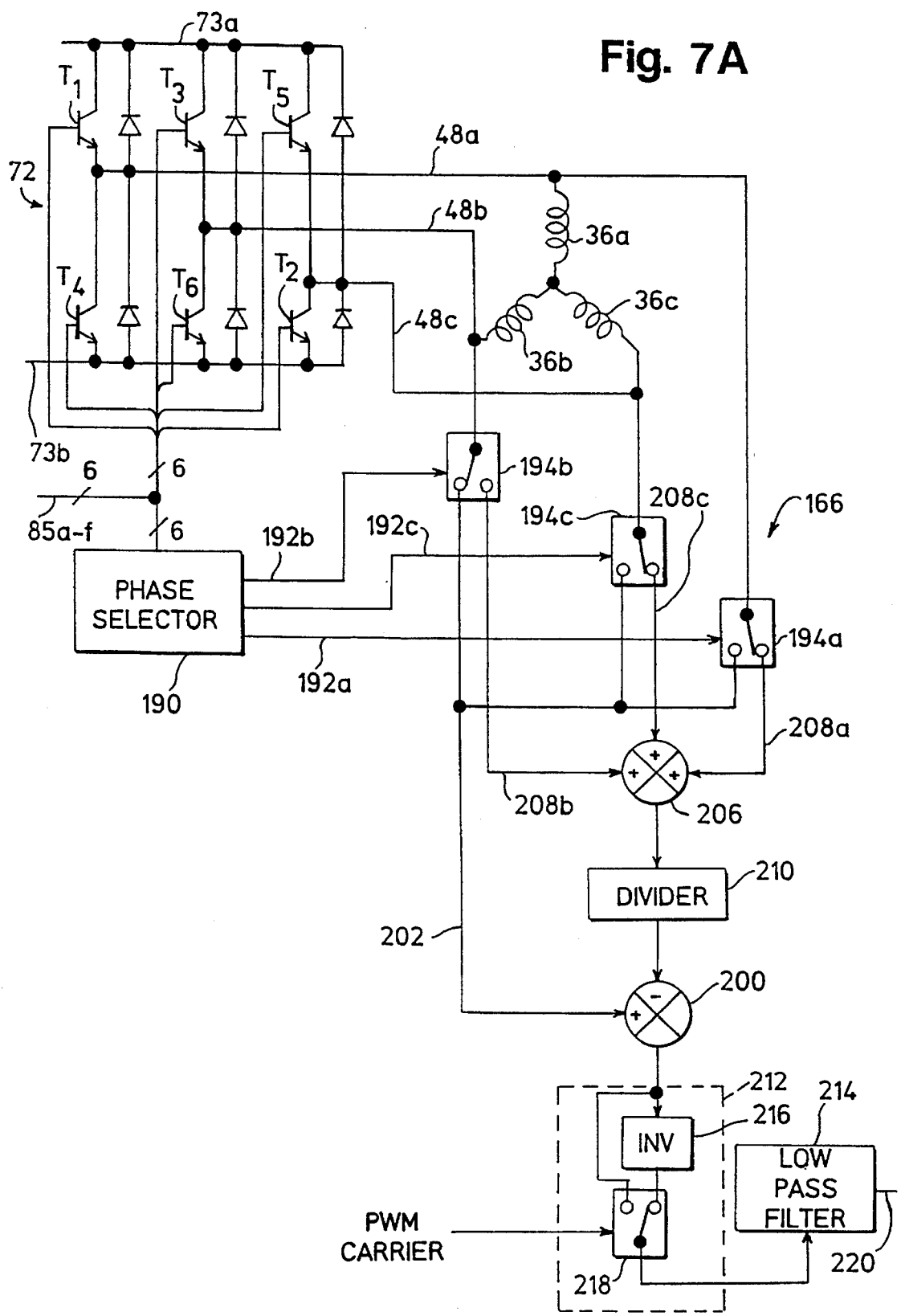
FIG. 7A is a diagram of the inverter, the main generator portion armature phase windings, and a portion of the reluctance controller of FIG. 5.

FIG. 7A illustrates the main inverter 72 when it is connected to the phase windings 36a–36c by the switches 56a–56c (not shown in FIG. 7A) during the starting mode and a portion of the reluctance controller 166 which generates a rotor position signal based on the differential reluctance between successively selected pairs of phase windings 36a–36c. The inverter 72 includes six controllable transistor power switches $T_1$–$T_6$ and six flyback diodes D6–D11. The actuation of the power switches $T_1$–$T_6$ is controlled by the inverter drive signals provided by the lines 85a–85f, which signals are shown as waveforms WT1–WT6 in FIG. 8. The positive portions of the waveforms WT1–WT6 may be pulse-width modulated (not shown) by a PWM carrier signal having a much higher frequency than the fundamental frequency of the waveforms WT1–WT6.

The reluctance controller 166 includes a phase selector 190 which also receives the six drive signals WT1–WT6 on the lines 85a–85f and generates therefrom three switch actuator signals on three lines 192a–192c which are used to selectively activate three switches 194a–194c, each of which has an input connected to one of the phase windings 36a–36c. Each of the switches 194a–194c has a first output, shown at the bottom left portion of each switch, which is connected to the noninverting input of a summing amplifier 200 via a line 202. Each of the switches 194a–194c has a second output, shown at the bottom right portion of each switch, which is connected to one of three noninverting inputs of a summing amplifier 206 via one of three lines 208a–208c.

At any given time during the starting mode of operation, there is current flowing through exactly two of the three phase windings 36a–36c, with the third phase winding having no current passing therethrough, or being "unenergized." The currents passing through the phase windings 36a–36c are shown represented as $I_A$, $I_B$, $I_C$, respectively, in FIG. 8.

The phase selector 190 generates the switch actuator signals on the lines 192a–192c so that the voltage generated on the unenergized phase winding, resulting from transformer coupling of such winding to the energized phase windings, is provided to the noninverting input of the summing amplifier 200. This is accomplished by causing the switch 194 connected to the unenergized phase winding to connect its input to the output shown at the bottom left portion of the switch.

If the phase winding to which a switch 194 is connected is energized, the switch input is connected to the output shown at the bottom right portion of the switch, so that the voltages on the two energized phase windings are provided to two of the noninverting inputs of the summing amplifier 206.

The switch positions as shown in FIG. 7A occur when the phase winding 36b is unenergized and the phase windings 36a, 36c are energized. The switch actuator signals generated by the phase selector 190 on the lines 192a–192c are designated S1–S3, respectively, in FIG. 8 and are shown with respect to the waveforms WT1–WT6 from which they are generated. The switch actuator signal S1 has a high value when neither waveform WT1 nor WT4 has a high value; the signal S2 has a high value when neither waveform WT3 nor WT6 has a high value; and the signal S3 has a high value when neither waveform WT2 nor WT5 has a high value.

In operation during the starting mode, two of the three windings 36a–36c are energized, leaving the third winding unenergized. The switches 194a–194c are repeatedly switched, as described above, so that the voltage on the unenergized winding is always provided to the noninverting input of the summing amplifier 200 via the line 202 and the voltages on the energized phase windings are always provided to the summing amplifier 206. The amplifier 206 sums the voltages of the two energized windings, and the sum is provided to a divider 210 which divides the sum by the number of energized phase voltages used to generate the voltage sum, which in this case is two, to generate an average phase voltage signal.

The voltage on the unenergized phase winding will have a relatively large DC component and a relatively small AC component with a phase or envelope representative of rotor position. For example, if the voltage difference between the lines 73a and 73b is 270 volts, the DC component of the unenergized phase voltage is approximately 135 volts, and the average of the voltages of the two energized phase windings is approximately 135 volts. The relatively small AC component of the unenergized phase voltage might be one volt peak-to-peak.

In order to extract the small AC component of the unenergized phase voltage, which contains the information regarding the angular position of the rotor 20 with respect to the stator 26, the average phase voltage signal generated by the divider 210 is provided to the inverting input of the summing amplifier 200, where it is subtracted from the unenergized phase voltage, resulting in the AC component of the unenergized phase voltage which is representative of rotor position.

The positive portions of the pulses of waveforms WT1–WT6 shown in FIG. 8 may be pulse-width modulated (not shown) by a carrier signal having a much higher frequency than the waveforms WT1–WT6. As a result, the rotor position signal generated by the summing amplifier 200 has a frequency and phase the same as the PWM carrier frequency, but the envelope of the signal varies at a much lower frequency with a phase which is representative of rotor position.

To extract the lower frequency envelope from the rotor position signal, the output of the summing amplifier 200 is provided to a synchronous demodulator circuit comprising a multiplier 212 and a low pass filter 214. The multiplier 212 comprises a logical inverter 216 and a two-input switch 218. A first input of the switch 218 is connected to receive the rotor position signal from the amplifier 200, and a second output of the switch 218 is connected to receive an inverted rotor position signal from the inverter 216. The switch 218 is switched at the frequency of the PWM carrier signal to alternately provide at its output the uninverted and inverted rotor position signal. This particular multiplier circuit 212 is used in the case of a square-wave PWM carrier signal. Other types of multiplier circuits and synchronous demodulator circuits could also be used.

Figure 7B:
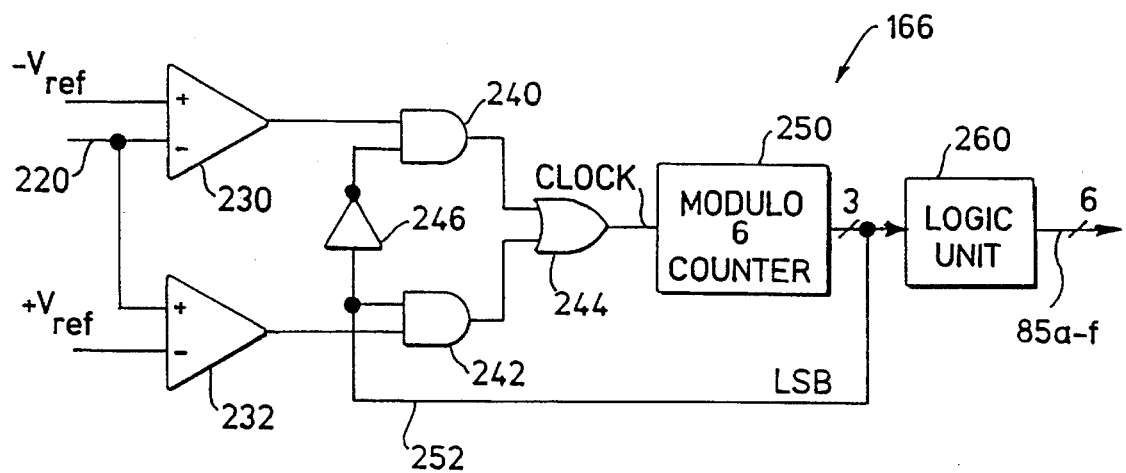
FIG. 7B is a diagram of a second portion of the reluctance controller of FIG. 5.

The demodulated rotor position signal is generated on a line 220 and provided to a portion of the reluctance controller 166, shown in FIG. 7B, which converts the rotor position signal into a clock signal and generates from that clock signal the six drive signals WT1–WT6 for controlling the transistor power switches $T_1$–$T_6$ of the main inverter 72. Referring to FIG. 7B, the rotor position signal on the line 220 is provided to the negative input of a first comparator 230 and the positive input of a second comparator 232. The first comparator 230 determines when the magnitude of the rotor position signal is more negative than a predetermined negative voltage $-V_{ref}$ and the second comparator 232 determines when the magnitude of the rotor position signal is greater than a predetermined positive voltage $+V_f$.

The clock signal is generated from the output of the comparators 230, 232 by a 1-of-2 data selector comprising a pair of AND gates 240, 242, an OR gate 244, and an inverter 246. A first binary data select signal is provided to the AND gate 242 via a line 252 and a second binary data select signal is provided to the AND gate 240 via the inverter 246 connected to the line 252. The data select signals, which at all times are complemented with respect to each other, are generated from the least-significant bit (LSB) of a counter 250 so that the data select signals values switch each time the count of the counter increases by one.

Figure 9:
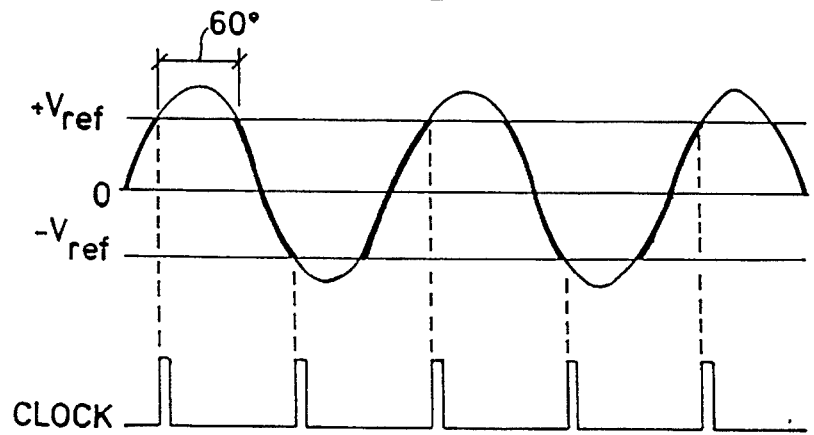
FIG. 9 illustrates a number of signals generated in the reluctance controller portion of FIG. 7B.
Figure 10:
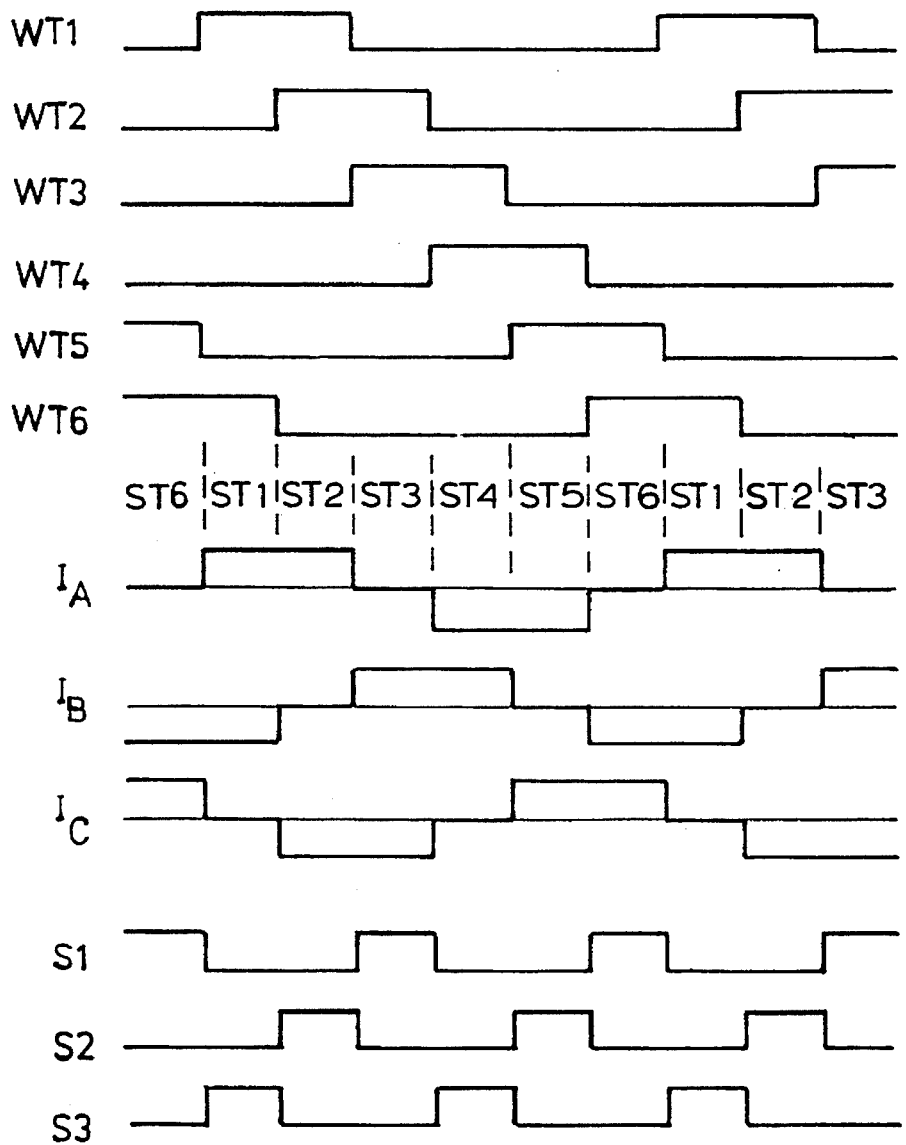
FIG. 10 illustrates a table specifying the output signals generated by the logic unit of FIG. 7B.

The rotor position signal, the $+V_{ref}$ and $-V_f$ signals, and the clock signal generated by the OR gate 244 are shown in FIG. 9. The rising edge of each pulse of the clock signal is triggered alternately by the magnitude of the rotor position signal reaching the predetermined $+V_{ref}$ and $-V_{ref}$ signals. The rising edge of each clock pulse triggers the counter 250 to increase the count, causing the binary value of the least significant bit to change and the magnitudes of the data select signals to switch high and low states. As a result, the AND gate 240 or 242 that generated the high binary value (when either the $+V_{ref}$ or $-V_{ref}$ magnitude was exceeded) is no longer selected, and the clock signal magnitude falls to zero shortly after each rising edge.

The actual shape of the rotor position signal generated on the line 220 approximates the waveform produced by horizontally joining together the bold portions of the sinusoidal signal shown in FIG. 9, which fall between the $+V_{ref}$ and $-V_{ref}$ thresholds, so that an approximate triangular waveform is created. The magnitude of the actual rotor position signal does not substantially exceed the $+V_{ref}$ and $-V_{ref}$ thresholds because, when the rotor position signal reaches each threshold, the drive signals on the lines 85a–85f cause the rotor 20 to be advanced 60 electrical degrees shortly thereafter. The magnitudes of the $+V_{ref}$ and $-V_{ref}$ thresholds should be selected so that the horizontal "spacing" between the bold portions of the rotor position signal corresponds to 60 electrical degrees, as shown in FIG. 9. The magnitudes of the $+V_{ref}$ and $-V_{ref}$ thresholds may be selected to be a predetermined percentage of the voltage across the DC link conductors 54a–54b, the percentage being based upon generator parameters.

The counter 250 is a modulo-six counter having a three-bit binary output. The output of the counter 250 is provided to a logic unit 260 which generates the six transistor drive signals WT1–WT6 in accordance with the counter output in accordance with the table shown in FIG. 10.

When the generator 10 is initially started, the counter 250 can be initialized with one of six initial counts so that one set of drive signals is generated on the lines 85a–85f. If the counter 250 does not increment within a predetermined period of time, meaning that the initial set of drive signals did not cause any torque to be produced on the rotor 20, the counter 250 can be loaded with another one of the six initial counts until the correct count is loaded. The loading of the initial counts could be performed by a digital signal processor coupled to the counter 250.

The 1-of-2 selector, the counter 250, the logic unit 260, and/or other features of the described embodiment could be implemented with a digital signal processor or other processor executing a computer program.

Figure 11:
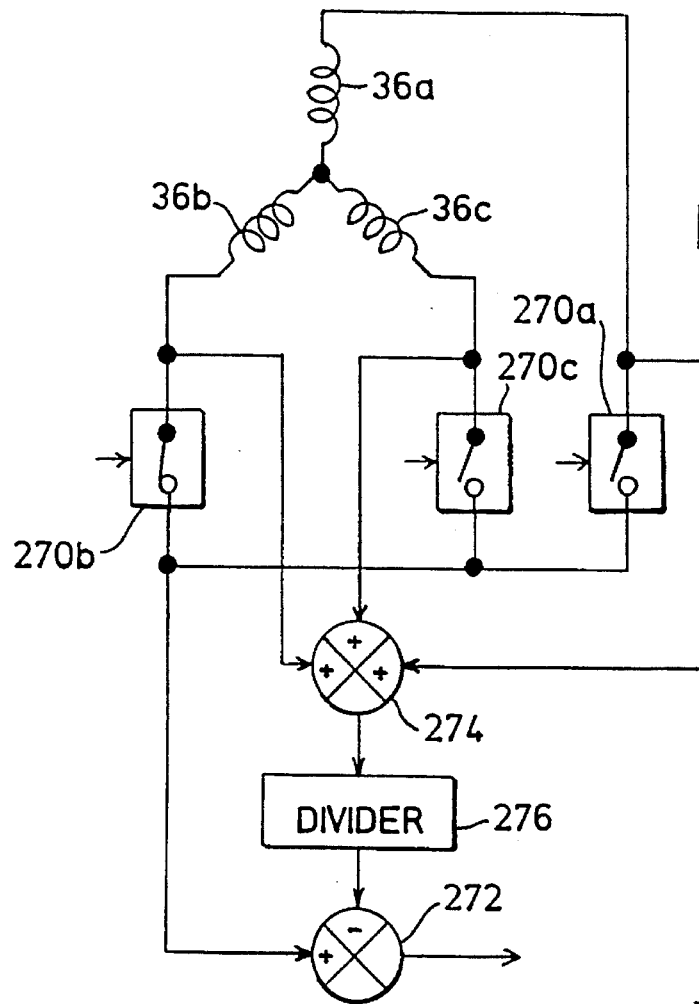
FIG. 11 is a diagram of a portion of a first alternative embodiment of the reluctance controller of FIG. 5.

A portion of a first alternative embodiment is shown in FIG. 11. In this embodiment, the phase windings 36a–36c are connected to three switches 270a–270c, respectively, each of which has a single output connected to the noninverting input of a summing amplifier 272. The switches 270a–270c are switched such that the unenergized phase winding is connected to the noninverting input of the summing amplifier 272. Each of the phase windings 36a–36c is also connected to a respective noninverting input of a summing amplifier 274, which generates a signal representing the sum of the phase winding voltages. The phase voltage sum is provided to a divider 276, which divides the phase voltage sum by three to generate a signal representing the average phase voltage. The average phase voltage is provided to the inverting input of the amplifier 272 whereby that voltage is subtracted from the voltage at the unenergized phase winding. The output of the summing amplifier 272 would be provided to the multiplier circuit 212 of FIG. 7A.

Figure 12:
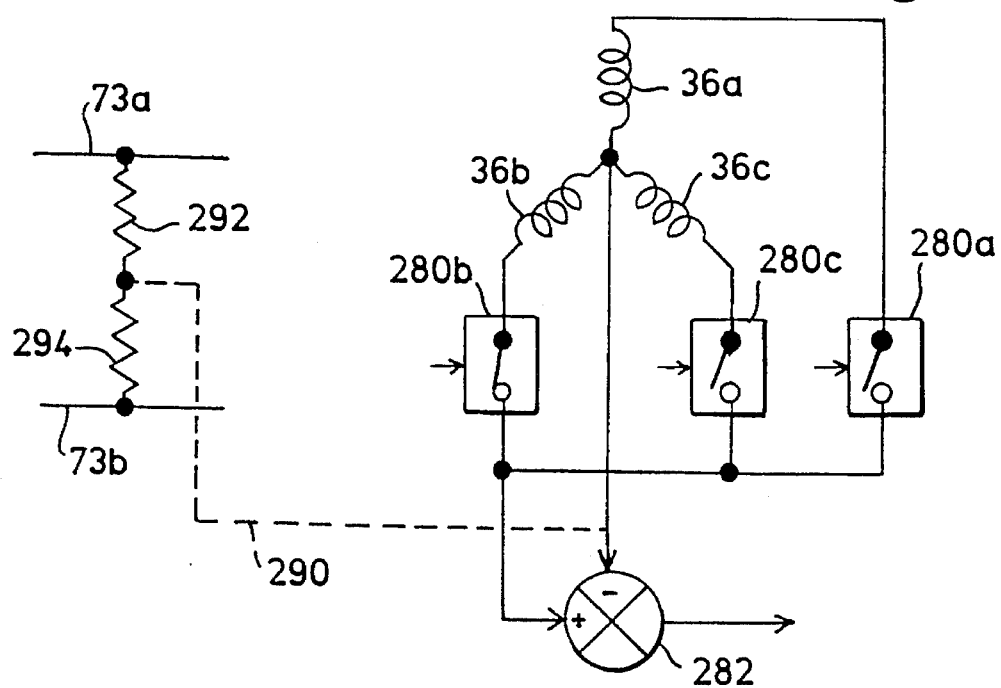
FIG. 12 is a diagram of a portion of a second alternative embodiment of the reluctance controller of FIG. 5.

A portion of a second alternative embodiment is shown in FIG. 12. In this embodiment, the phase windings 36a–36c are connected to three switches 280a–280c, respectively, which are switched so that the unenergized phase winding is connected to the noninverting input of a summing amplifier 282. The junction of the phase windings 36a–36c is connected to the inverting input of the amplifier 282 so that the voltage at the junction of the windings is subtracted from the voltage at the unenergized phase winding. The output of the summing amplifier 282 would be provided to the multiplier circuit 112 of FIG. 7A.

As a further alternative, shown in the left-hand portion of FIG. 12, instead of connecting the inverting input of the amplifier 282 to the junction of the phase windings 36a–36c, the inverting input could be coupled, via dotted line 290, to the junction of a pair of identical resistors 292, 294 provided across the DC link conductors 73a–73b so that the inverting input of amplifier 282 would receive a signal representing one-half the voltage across the DC link conductors 73a–73b.

Figure 13:
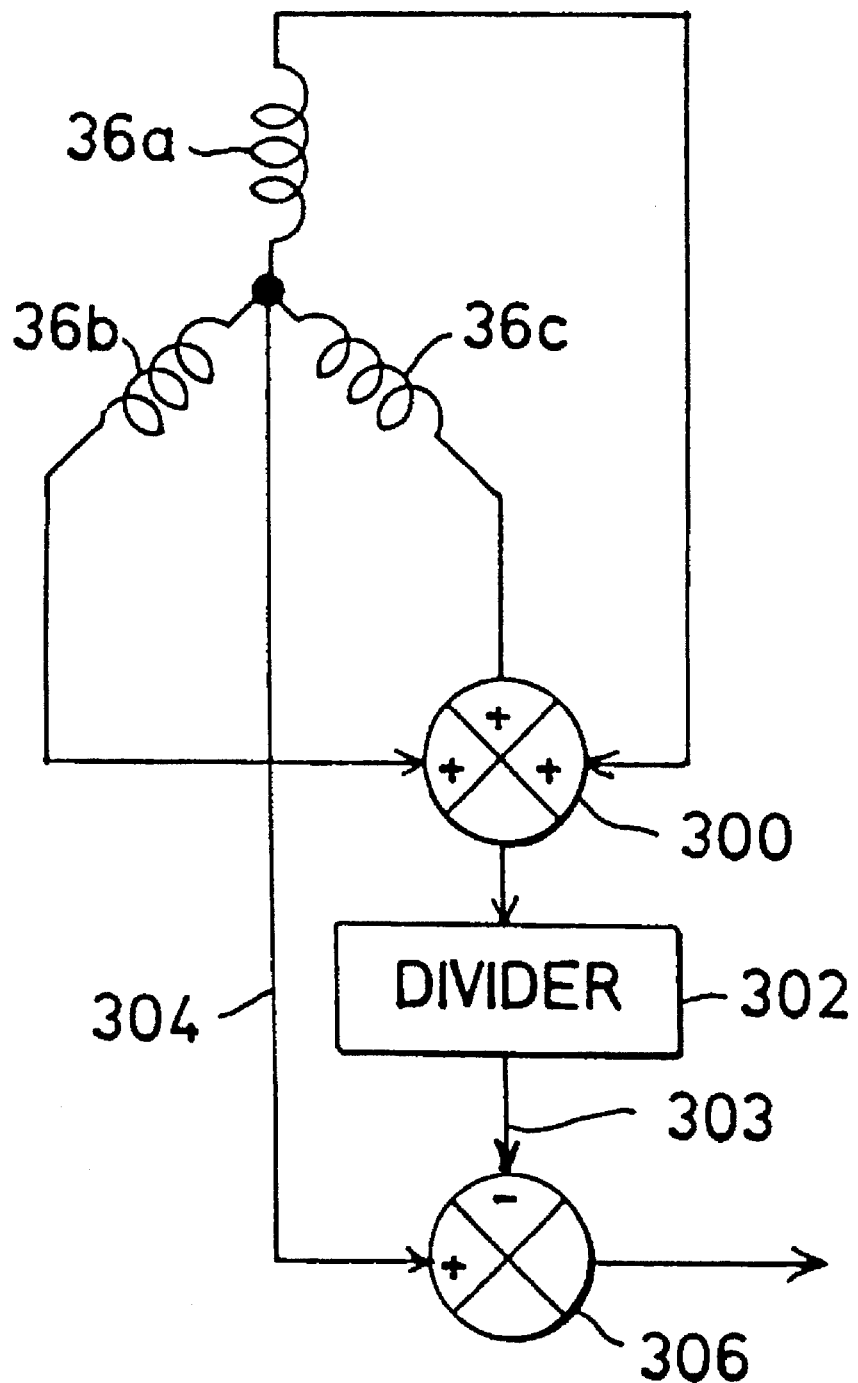
FIG. 13 is a diagram of a portion of a third alternative embodiment of the reluctance controller of FIG. 5.

A portion of a further alternative embodiment is illustrated in FIG. 13. In the embodiment of FIG. 13, rotor position is detected based on inductance sensing instead of differential reluctance sensing. Referring to FIG. 13, the voltages on all three phase windings 36a–36c are provided to a summing amplifier 300, which generates a signal representing the voltage sum. The voltage sum signal is provided to a divider 302, which divides the voltage sum signal by three to generate an average phase voltage signal on a line 303. The voltage at the junction of the wye-connected windings 36a–36c is provided via a line 304 to the noninverting input of a summing amplifier 306. The summing amplifier 306 generates a rotor position signal by subtracting the average phase voltage signal on the line 303 from the junction voltage on the line 304. In the embodiment of FIG. 13, the average phase voltage signal on the line 303 could be generated in other ways. For example, it could be generated by dividing the sum of the voltages on the energized phase windings by two, or it could be generated by dividing the DC link voltage by two.

Back-EMF Controller 160

Figure 14:
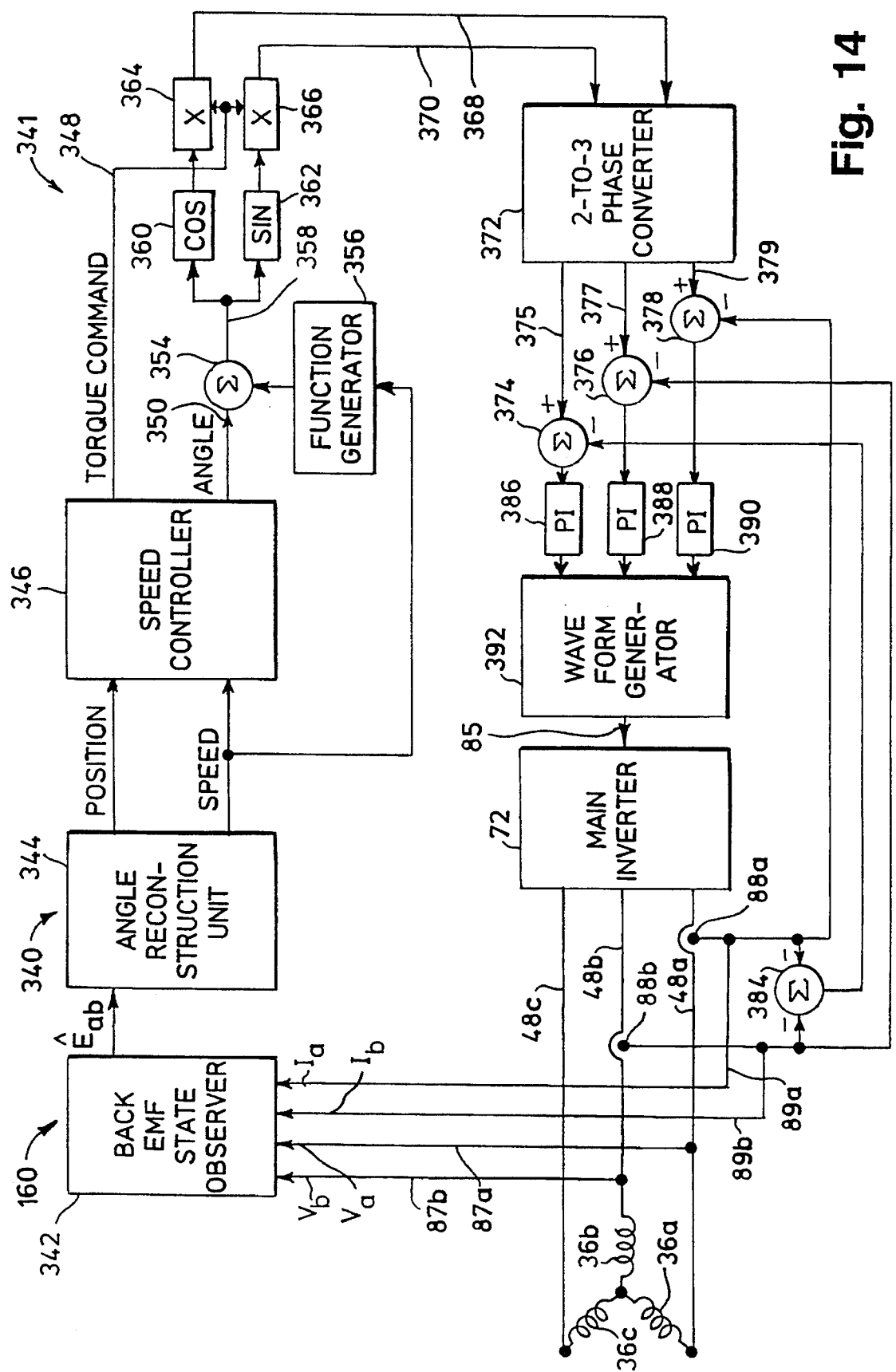
FIG. 14 is a block diagram of the back-EMF controller of FIG. 5.

The structure and operation of the back-EMF controller 160 is described below in connection with FIGS. 14–19. FIG. 14 is a block diagram of the back-EMF controller 160 shown schematically in FIG. 5 along with the main inverter 72 and the main generator portion armature windings 36a–36c. The back-EMF controller 160 includes a rotor position detector 340 and a starting system control 341 for operating the generator 10 in a starting mode to convert electrical power into motive power. The rotor position detector 340 includes a back EMF state observer 342 and an angle reconstruction unit 344. The back EMF state observer 342 is responsive to the phase voltage signals $V_a$ and $V_b$ on the lines 87a–87b and the phase current signals $I_a$ and $I_b$ on the lines 89a–89b and produces a back EMF estimate signal $\hat{E}_{ab}$ indicative of the back EMF voltage. The angle reconstruction unit 344 responds to the back EMF estimate signal $\hat{E}_{ab}$ to develop signals representing the position and speed of the motive power shaft 18 which are delivered to a speed controller 346.

The speed controller 346 develops a torque command signal on a line 348 representing the commanded torque to be produced by the generator 10 and a further signal on a line 350 representing the mechanical position of the motive power shaft 18. The signal on the line 350 is summed with a phase advance signal by a summer 354. The phase advance signal is developed by a function generator 356 and is dependent upon the speed of the motive power shaft 18 as detected by the angle reconstruction unit 344. The function generator 356 provides increasing phase advance as speed increases in a high speed range. The summer 354 develops an electrical angle command signal on a line 358 which is supplied to first and second functional blocks 360, 362 which generate a cosine waveform signal and a sine waveform signal, respectively, each of which has the same frequency as the electrical angle command signal on the line 358.

Second and third multipliers 364, 366 are coupled to the functional blocks 360, 362, respectively, and multiply the outputs thereof with the torque command signal on the line 348. The output signals generated by the multipliers 364, 366 are provided to a 2-to-3 phase converter 372 via a pair of lines 368, 370. The phase converter 372 converts those signals into three-phase sinusoidal current signals which are in turn supplied to three summers 374, 376, and 378 via lines 375, 377, and 379, respectively.

Each of the summers 374, 376, and 378 sums one of the three-phase current signals produced by the phase converter 372 with a signal representing the magnitude of a phase current of the AC power to obtain an error signal. In the case of the summers 376 and 378, the phase current magnitudes are detected by current sensors 88a–88b while the phase current magnitude for the summer 374 is obtained by a summer 384 which adds (in a negative sense) the magnitudes developed by the current sensors 88a–88b. The error signals are processed by gain and compensation units 386, 388, and 390, preferably of the proportional-integral type, and are provided to a waveform generator 392 which generates the commutation signals and provides them to the main inverter 72.

The back EMF state observer 342 estimates the back EMF voltage produced by the generator 10 while it is operating in the starting mode. During the starting mode, currents flow in the armature phase windings 36a–36c according to the following current state equation:

$$\frac{d(I_{ab})}{dt} = \frac{1}{L}(V_{ab} - E_{ab} - RI_{ab})$$

Where:

$V_{ab}$ is the line-to-line voltage;

$E_{ab}$ is the line-to-line back EMF voltage across the lines 48a and 48b;

$I_{ab}$ is the difference between the current signals $I_a$ and $I_b$ produced by the current sensors 88a, 88b, respectively;

L is the armature winding inductance; and

R is the armature winding resistance.

Although the above formula can be implemented by differentiating the currents flowing in the main generator portion armature windings 36a–36c, known differentiation processes are vulnerable to noise. To avoid differentiation, the back EMF state observer 342 is configured as shown in FIG. 15.

Figure 15:
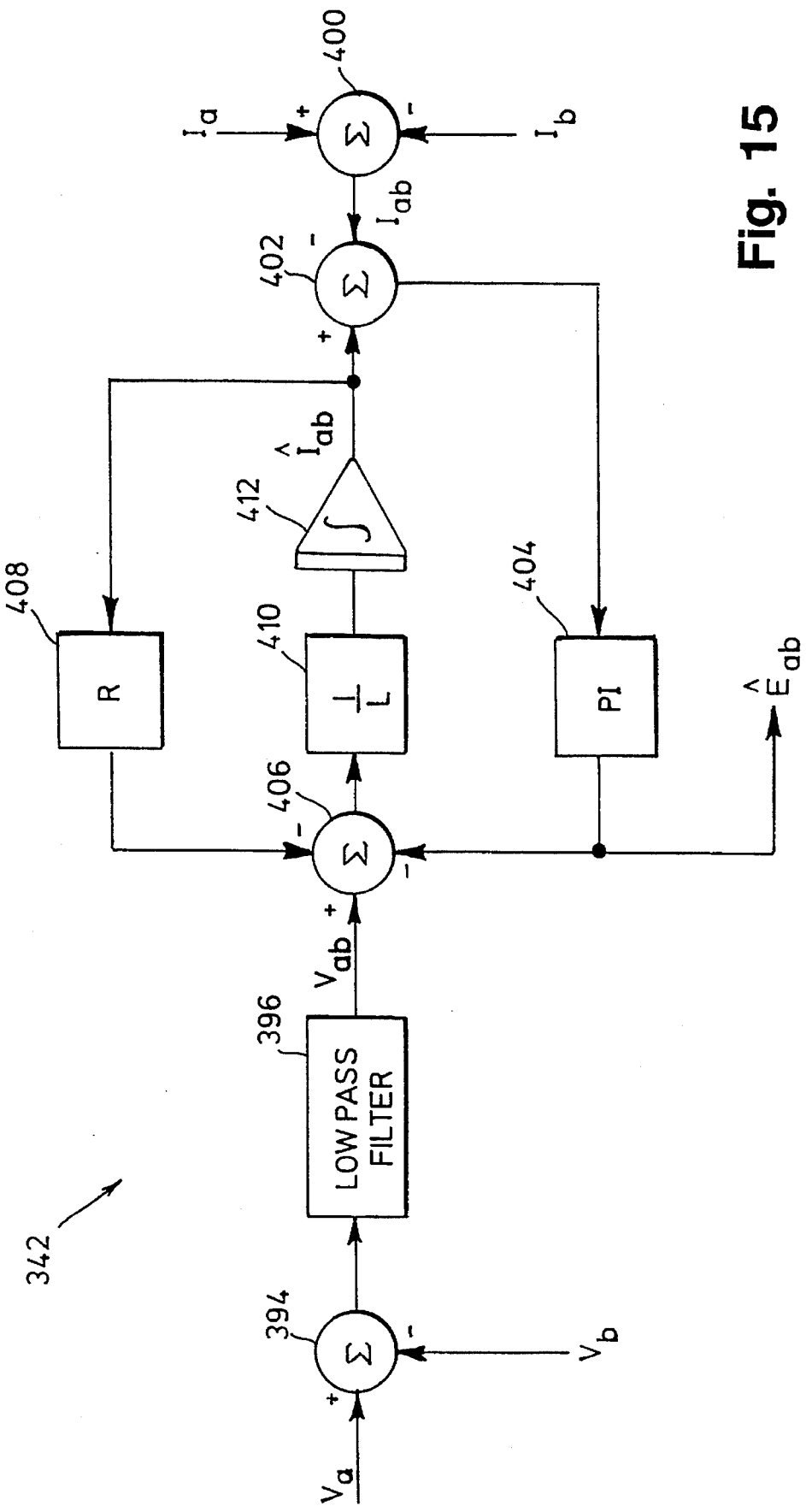
FIG. 15 is a block diagram of the back EMF state observer of FIG. 14.

Referring to FIG. 15, the voltages $V_a$ and $V_b$ appearing at the lines 48a and 48b, respectively, are delivered to a summer 394, an output of which is passed through a low pass filter 396 to produce the line-to-line voltage signal $V_{ab}$. The current signal $I_b$ is subtracted from the current signal $I_a$ by a summer 400 to produce the current magnitude signal $I_a$. The current magnitude signal $I_{ab}$ is delivered to an inverting input of a summer 402 while a current estimate signal $\hat{I}_{ab}$, produced as described below, is delivered to a non-inverting input of the summer 402. The output of the summer 402 is delivered to a conditioner 404, which preferably comprises a proportional-integral type compensator, but which could also comprise a nonlinear controller. The conditioner 404 produces the back EMF estimate signal $\hat{E}_{ab}$ and delivers such signal to an inverting input of a summer 406 and to the angle reconstruction unit 344 of FIG. 14. The current estimate signal $\hat{I}_{ab}$ is delivered to a conditioner 408 preferably comprising a gain unit with a gain value of R and having an output coupled to an inverting input of the summer 406. The summer 406 subtracts the current estimate signal $\hat{I}_{ab}$ as conditioned by conditioner 408 and the back EMF estimate signal $\hat{E}_{ab}$ from the line-to-line voltage signal $V_{ab}$ developed by the low pass filter 396. An output signal developed by the summer 406 is conditioned by a conditioner 410, preferably comprising a gain unit having a gain value of 1/L, and integrated by an integrator 412 to produce the terminal current estimate signal $\hat{I}_{ab}$.

Although the back EMF state observer 342 is shown implemented by analog components, it should be noted that the back EMF state observer 342 could, instead, be implemented by a microprocessor suitably programmed to perform the functions described above.

Figure 16:
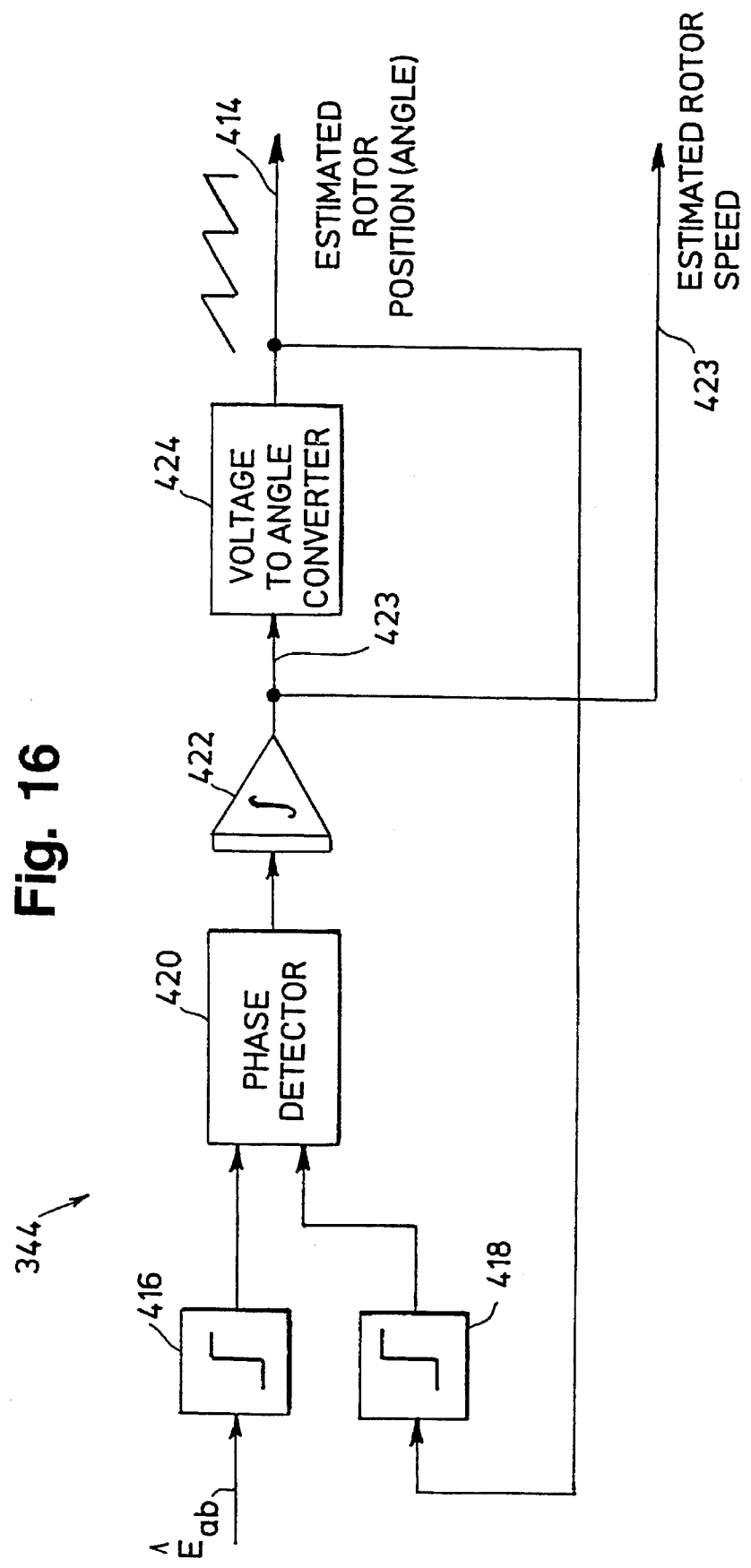
FIG. 16 is a block diagram of a first embodiment of the angle reconstruction unit of FIG. 14.

Referring now to FIG. 16, a first embodiment of the angle reconstruction unit 344 is shown in greater detail. This embodiment comprises a phase-locked loop which responds to the back EMF estimate signal $\hat{E}_{ab}$ to develop the indication of the angular position of the motive power shaft 18 at an output 414. Zero crossing detectors 416 and 418 detect the zero crossings of the back EMF estimate signal $\hat{E}_{ab}$ and the angular position indication developed at the output 414 to produce square wave signals which are delivered to a phase detector 420. The phase detector 420 compares the outputs of zero crossing detectors 416 and 418 to produce an error signal indicative of the phase difference between the back EMF estimate signal $\hat{E}_{ab}$ and the angular position indication. The integrator 422 integrates the error signal and the integrated error signal is passed via a line 423 to a voltage-to-angle converter 424, which preferably comprises a voltage-controlled oscillator. The voltage-to-angle converter 424 produces a ramp signal having a magnitude that is indicative of the angular position of the motive power shaft 18.

The signal generated on the line 423, which is generated by the integration of the phase errors detected by the phase detector 420, has a magnitude that increases with frequency. Thus, the signal on the line 423 is representative of the estimated speed of the motive power shaft 18.

FIG. 16A illustrates a first embodiment of the voltage-to-angle converter 424 shown schematically in FIG. 16. The converter 424 includes a voltage-to-frequency (V/F) converter 425 connected to receive the speed signal output by the integrator 422 (FIG. 16). Based on the magnitude of the speed signal, the V/F converter 425 generates an output signal of a particular frequency that is provided to the count input of a counter 426. The count signal generated by the counter 426 is provided to a digital-to-analog (D/A) converter 427, which generates a ramp signal having a magnitude related to rotor position. In operation, as the magnitude of the speed signal on the line 423 increases, the frequency of the signal generated by the V/F converter 425 increases, thus increasing the rate at which the counter 425 counts and increasing the frequency of the ramp signal generated by the D/A converter 427. Preferably, the counter 426 is of the modulo type and hence automatically resets when its count reaches a predetermined value, thus causing the downward portions of the ramp signal to occur automatically.

FIG. 16B illustrates a second embodiment of the voltage-to-angle converter 424 shown schematically in FIG. 16. The converter 424 includes an integrator 428 connected to receive the speed signal output by the integrator 422 (FIG. 16). The integrator 428 generates a ramp signal having a magnitude related to rotor position. The integrator 428 is periodically reset by the output of a level comparator 429 when the integrator output reaches a predetermined level, which causes the downward sloping portions of the ramp signal.

Figure 17:
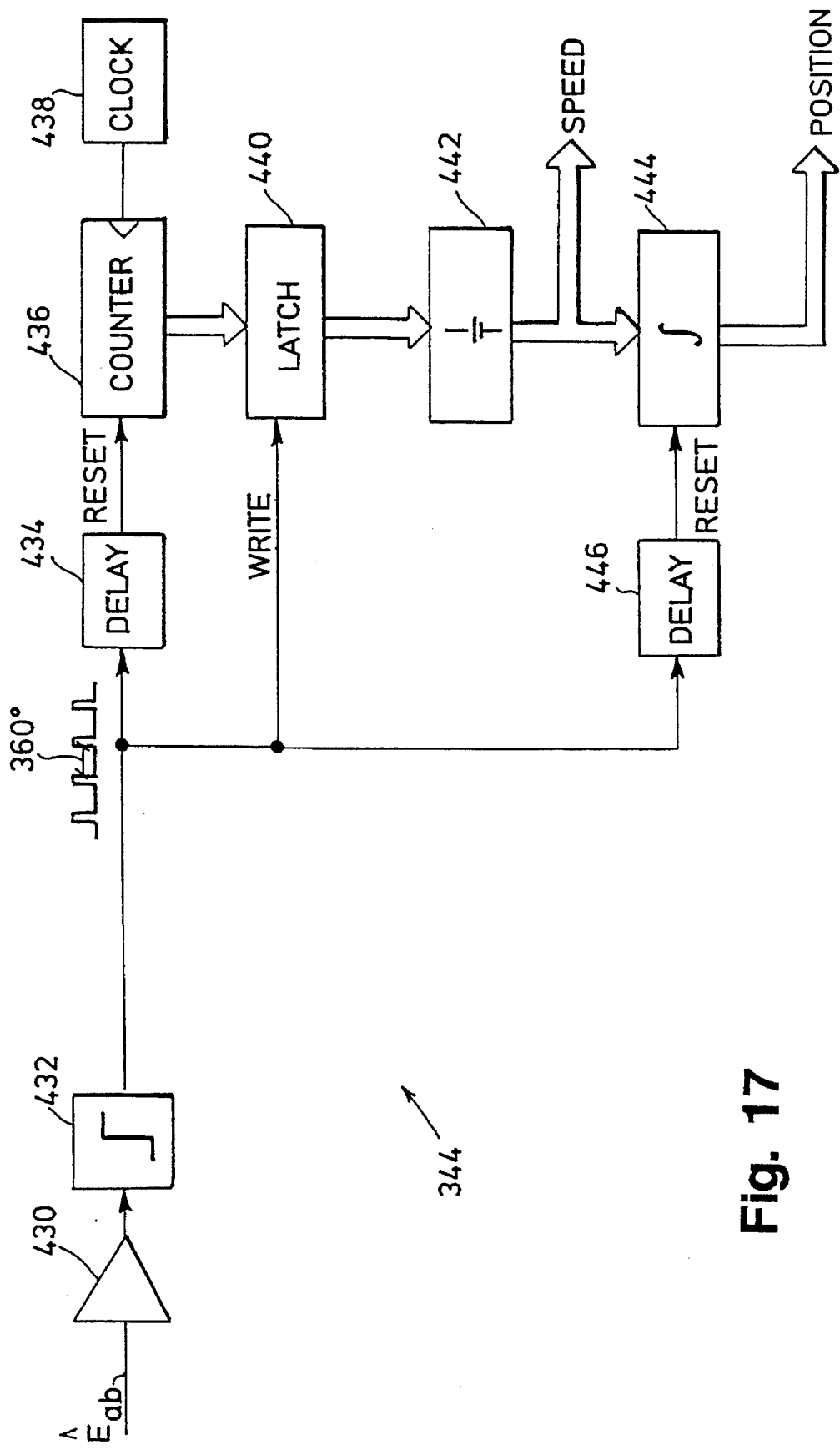
FIG. 17 is a block diagram of a second embodiment of the angle reconstruction unit of FIG. 14.

Referring now to FIG. 17, an alternative embodiment of the angle reconstruction unit 344 is shown in greater detail. The back EMF estimate signal $\hat{E}_{ab}$ is supplied to an interface amplifier 430 and a zero crossing detector 432 which produces a narrow pulse each time the $\hat{E}_{ab}$ signal rises upwardly through the zero axis, which occurs every 360 electrical degrees. The output of the zero crossing detector 432 is provided to a delay circuit 434 which in turn provides a reset signal to a counter 436. The counter 436 accumulates clock pulses produced by a clock 438 and is reset every 360° of the back EMF estimate signal $\hat{E}_{ab}$. The output of the counter 436 represents the time that elapses between consecutive pulses produced by the zero crossing detector 432. The falling edge of each pulse comprises a write command to a latch 440 which latches the output of the counter 436. The output of the latch 440 is inverted, i.e., the reciprocal thereof is calculated, by a circuit 442, which generates a signal having a magnitude that is representative of the speed of the motive power shaft 18, and thus of the rotor 20.

The speed signal generated by the circuit 442 is supplied to an integrator 444, which integrates the speed signal to generate a signal having a magnitude that is representative of the angular position of the motive power shaft 18, and thus of the rotor 20. The integrator 444 is reset every 360° of rotation of the rotor 20 via a reset signal generated by a delay circuit 446 connected to receive the 360° -spaced pulses generated by the zero crossing detector 432 so that a ramp-shaped position signal is generated.

Figure 18:
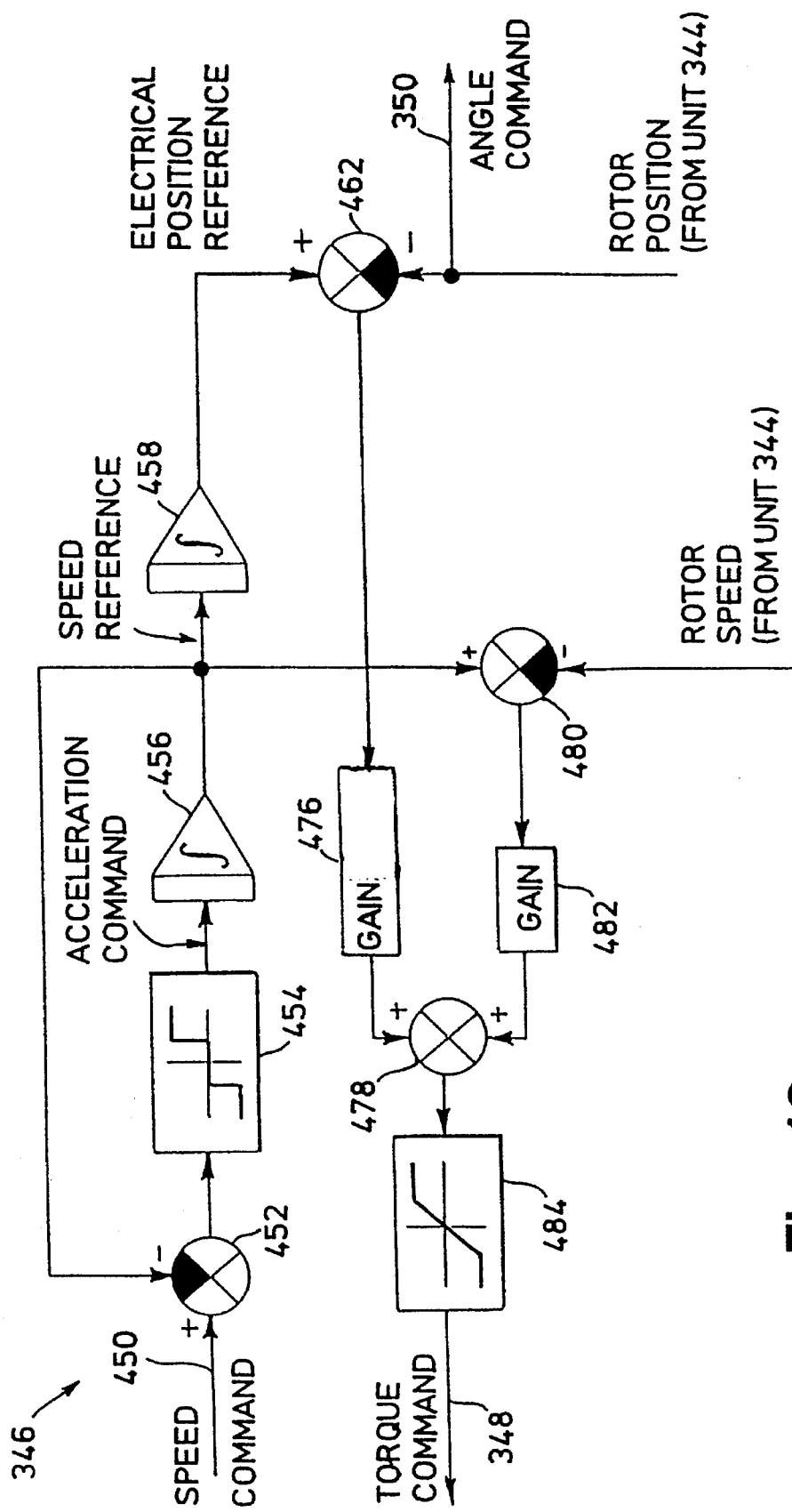
FIG. 18 is a block diagram of the speed controller of FIG. 14.

FIG. 18 illustrates in greater detail the speed controller 346 shown schematically in FIG. 14. In response to the rotor speed and rotor position signals generated by the angle reconstruction unit 344, the speed controller 346 generates an angle command and a torque command.

Referring to FIG. 18, a speed command signal is provided via a line 450 to the non-inverting input of a summer 452. The speed command may comprise a step voltage from a first voltage to a second, higher voltage or may comprise any other type of waveform as desired. The output of the summer 452 is coupled to a function generator 454 which develops an acceleration command signal which is, in turn, integrated by an integrator 456 to produce a speed reference signal. The speed reference signal is fed back to an inverting input of the summer 452, and hence the elements 452, 454, and 456 comprise a closed-loop circuit.

The speed reference signal is integrated by an integrator 458 to develop a position reference signal which is provided to the non-inverting input of a summer 462. The rotor position signal from the angle reconstruction unit 344 of FIG. 14 is also provided to an inverting input of the summer 462. The summer 462 produces a position error signal indicative of the difference between the derived position reference signal and the actual rotor position developed by the angle reconstruction unit 344. The position error signal is provided to a gain unit 476 and is supplied to a first input of a summer 478.

A speed error signal is developed by a summer 480 which subtracts the rotor speed signal developed by the angle reconstruction unit 344 of FIG. 14 from the speed reference signal developed by the integrator 456. The speed error signal is processed by a gain unit 482 and is summed with the output of the gain unit 476 by the summer 478. A limiter 484 provides limiting for the output of the summer 478 and develops a current limited torque command signal on the line 348 of FIG. 14.

Figure 19:
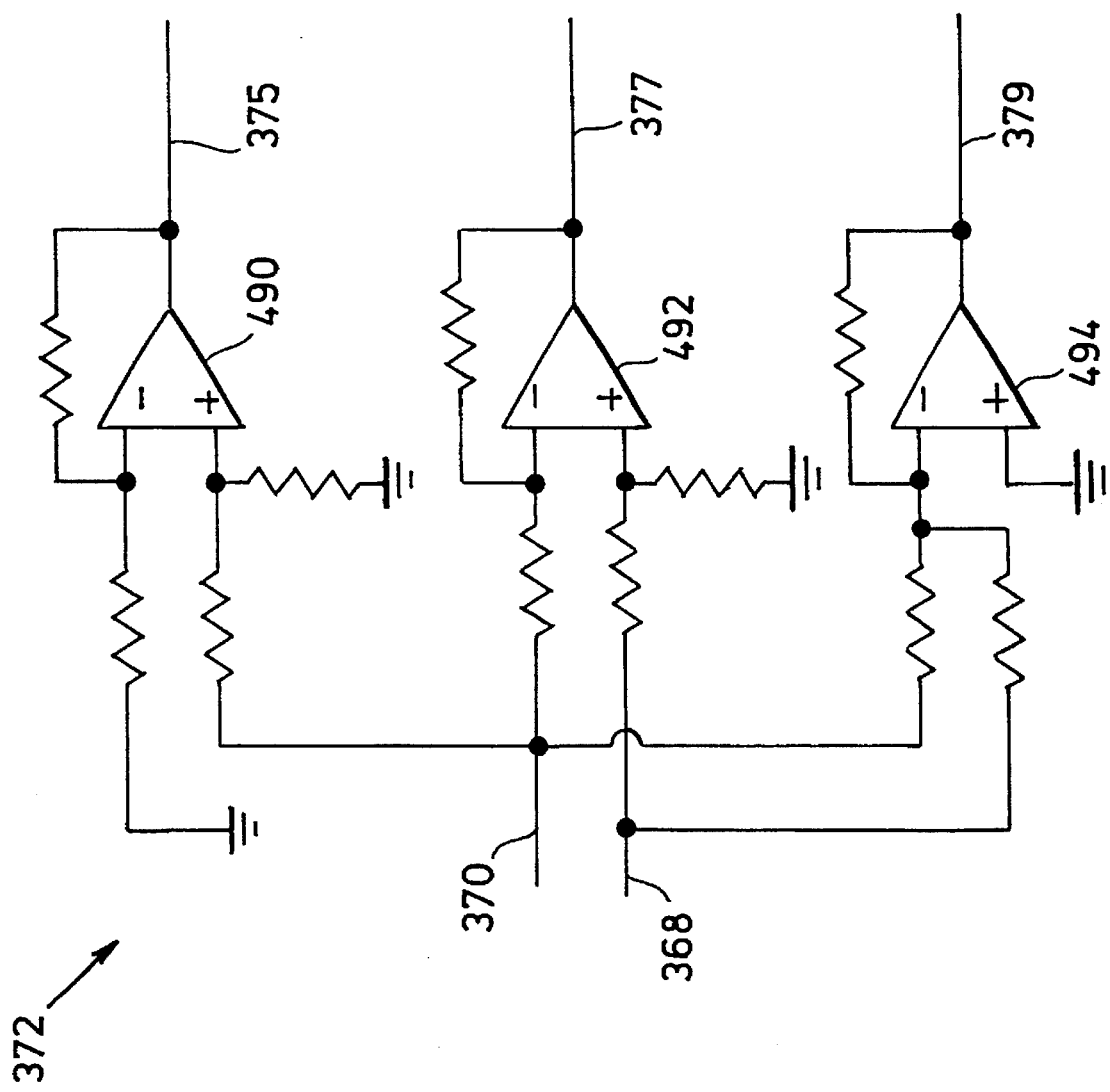
FIG. 19 is a circuit diagram of the phase converter of FIG. 14.

FIG. 19 illustrates in greater detail the phase converter 372 shown schematically in FIG. 14. The converter 372 includes three operational amplifiers 490, 492, 494 and associated biasing circuitry connected to the lines 368, 370 which generate outputs on the lines 375, 377, 379.

The control of the present invention avoids the problems noted with respect to prior art, i.e., the generator need not be modified to accomplish the start function, and the problems associated with the use of a DC exciter field winding for AC power excitation are avoided.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for a brushless generator having a main generator portion including a field winding disposed on a rotor and which receives field current and an armature winding disposed in a stator wherein the rotor is movable with respect to the stator and a permanent magnet generator (PMG) having an armature winding coupled to a rectifier which is coupled to a voltage regulator wherein the generator is operable in a generating mode to convert motive power into electrical power and in a starting mode to convert electrical power provided to the main generator portion armature winding into motive power, comprising:

an exciter having an exciter field winding disposed in the stator and an armature winding disposed on the rotor and coupled to the main generator portion field winding;

first and second power converters each having an input and an output;

means operable in the starting mode for coupling a source of electrical power to the inputs of the first and second power converters, the output of the first power converter to the main generator portion armature winding and the output of the second power converter to the exciter field winding and operable in the generating mode for disconnecting the source of electrical power from the first and second power converters and connecting the voltage regulator to the exciter field winding and the input of one of the power converters to the main generator portion armature winding; and means coupled to the first and second power converters and operable in the starting mode for controlling the power converters such that the first power converter provides AC power to the main generator portion armature winding and such that the second power converter provides AC and DC power simultaneously to the exciter field winding.

2. The control of claim 1, wherein the controlling means comprises means for causing the AC power applied to the exciter field winding to continuously decrease in magnitude during operation in the starting mode until a particular rotor speed is reached.

3. The control of claim 2, wherein the causing means includes means for applying only DC power to the exciter field winding after the particular rotor speed is reached.

4. The control of claim 3, wherein the applying means decreases a parameter of the DC power after a further particular rotor speed is reached.

5. The control of claim 4, wherein the parameter of DC power comprises DC voltage magnitude.

6. The control of claim 1, wherein the controlling means comprises means for causing the AC power applied to the exciter field winding to uniformly and continuously decrease in magnitude during operation in the starting mode until a particular rotor speed is reached.

7. The control of claim 1, wherein the first and second power converters comprise first and second inverters, respectively.

8. The control of claim 1, wherein the controlling means comprises means for causing the AC power applied to the main generator portion armature winding to uniformly and continuously increase in frequency during operation in the starting mode.

9. The control of claim 1, wherein the controlling means includes means for causing the AC power applied to the main generator portion armature winding to continuously increase in frequency during operation in the starting mode.

10. The control of claim 9, wherein the causing means includes means for detecting rotor position and means for commutating the main generator portion armature winding based upon the detected rotor position.

11. The control of claim 10, wherein the detecting means comprises a rotor position sensor.

12. A control for a brushless generator having a main generator portion including a field winding disposed on a rotor and which receives field current and a set of armature windings disposed in a stator wherein the rotor is movable with respect to the stator and a permanent magnet generator (PMG) having a set of armature windings coupled to a rectifier which is coupled to a voltage regulator wherein the generator is operable in a generating mode to convert motive power into electrical power and in a starting mode to convert electrical power provided to the set of main generator portion armature windings into motive power, comprising:

an exciter having an exciter field winding disposed in the stator and a set of armature windings disposed on the rotor and coupled to the main generator portion field winding by a set of rotating rectifiers;

first and second inverters and a rectifier bridge each having an input and an output;

contactors operable in the staring mode for coupling a source of electrical power to the inputs of the first and second inverters, the output of the first inverter to the set of main generator portion armature windings and the output of the second inverter to the exciter field winding and operable in the generating mode for disconnecting the source of electrical power from the first and second inverters and connecting the voltage regulator to the exciter field winding, the input of the rectifier bridge to the set of main generator portion armature windings and the input of one of the inverters to the output of the rectifier bridge; and means coupled to the first and second inverters and operable in the starting mode for controlling the inverters such that the first inverter provides AC power to the set of main generator portion armature windings and such that the second inverter simultaneously provides AC and DC power to the exciter field winding and such that AC power is produced at the output of such inverter.

13. The control of claim 12, wherein the controlling means includes means for applying only DC power to the exciter field winding after the particular rotor speed is reached.

14. The control of claim 13, wherein the applying means decreases a parameter of the DC power after a further particular rotor speed is reached.

15. The control of claim 14, wherein the parameter of DC power comprises DC voltage magnitude.

16. The control of claim 12, wherein the controlling means includes means for causing the AC power applied to the set of main generator portion armature windings to continuously increase in frequency during operation in the starting mode.

17. The control of claim 16, wherein the causing means includes means for detecting rotor position and means for commutating the set of main generator portion armature windings based upon the detected rotor position.

18. The control of claim 17, wherein the detecting means comprises a rotor position sensor.

19. The control of claim 12, wherein the controlling means comprises means for causing the AC power applied to the set of main generator portion armature windings to uniformly and continuously increase in frequency during operation in the starting mode.

20. The control of claim 12, wherein the controlling means comprises means for causing a parameter of the DC power applied to the exciter field winding to follow a predetermined schedule during operation in the starting mode.

21. The control of claim 20, wherein the predetermined schedule comprises increasing DC voltage magnitude between first and second rotor speeds, substantially constant DC voltage magnitude between the second rotor speed and a third rotor speed and decreasing DC voltage magnitude between the third rotor speed and a fourth rotor speed.

* * * * *